(12) United States Patent
Nomiyama et al.

(10) Patent No.: US 12,170,485 B2
(45) Date of Patent: Dec. 17, 2024

(54) SWITCHING REGULATOR CIRCUIT

(71) Applicant: SAMSUNG ELECTRONICS CO., LTD., Suwon-si (KR)

(72) Inventors: Takahiro Nomiyama, Seoul (KR); Jong Beom Baek, Yangju-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 254 days.

(21) Appl. No.: 17/937,492

(22) Filed: Oct. 3, 2022

(65) Prior Publication Data

US 2023/0155506 A1 May 18, 2023

(30) Foreign Application Priority Data

Nov. 17, 2021 (KR) .......................... 10-2021-0158838

(51) Int. Cl.
*H02M 3/158* (2006.01)
*H02M 1/00* (2006.01)
*H02M 3/157* (2006.01)

(52) U.S. Cl.
CPC ....... *H02M 3/1582* (2013.01); *H02M 1/0025* (2021.05); *H02M 1/009* (2021.05); *H02M 1/0095* (2021.05); *H02M 3/157* (2013.01)

(58) Field of Classification Search
CPC .... H02M 1/0025; H02M 1/008; H02M 1/009; H02M 1/0095; H02M 3/156; H02M 3/157; H02M 3/158; H02M 3/1582
See application file for complete search history.

(56) References Cited

U.S. PATENT DOCUMENTS

| | | | |
|---|---|---|---|
| 7,432,614 B2 | 10/2008 | Ma et al. | |
| 8,049,472 B2 | 11/2011 | Easwaran et al. | |
| 8,531,165 B2 | 9/2013 | Chen et al. | |
| 8,773,088 B2 | 7/2014 | Menegoli et al. | |
| 9,007,039 B2 | 4/2015 | Kim et al. | |
| 9,088,211 B2 | 7/2015 | Ivanov et al. | |
| 9,099,919 B2 | 8/2015 | Jing et al. | |
| 9,106,133 B2 | 8/2015 | Gilliom | |
| 9,312,771 B2 | 4/2016 | Ouyang | |
| 9,529,375 B2 | 12/2016 | Bayer | |
| 9,698,685 B2 | 7/2017 | Calhoun et al. | |
| 10,170,990 B2 | 1/2019 | Calhoun et al. | |
| 10,171,038 B1 | 1/2019 | Chen et al. | |
| 10,212,770 B2 | 2/2019 | Guo et al. | |

(Continued)

*Primary Examiner* — Gary L Laxton
(74) *Attorney, Agent, or Firm* — F. CHAU & ASSOCIATES, LLC

(57) ABSTRACT

Embodiments of a switching regulator include a single inductor or two inductors connecting an input circuit and a multi-output end circuit that may drive different loads at different respective voltage levels. The input circuit may include a plurality of input switches, and may boost an input voltage or a ground voltage via operation in one of a plurality of selected modes such as a buck mode, a boost mode and a boost-buck mode, to thereby provide an applied voltage to the one or more inductors. Each selected mode may be based on a target voltage for one of a plurality of unit output ends (output load driving sections) in the multi-output end circuit. Output voltages may be monitored and on-times of switches controlled in the multi-output end circuit to maintain the output voltages in respective target ranges.

20 Claims, 36 Drawing Sheets

(56) References Cited

U.S. PATENT DOCUMENTS

| | | |
|---|---|---|
| 10,291,126 B1 | 5/2019 | Wei et al. |
| 10,305,429 B2 | 5/2019 | Choo et al. |
| 10,476,388 B2 | 11/2019 | Chen et al. |
| 10,505,454 B2 | 12/2019 | Zhao et al. |
| 10,622,900 B1 | 4/2020 | Wei et al. |
| 10,715,043 B2 | 7/2020 | Samid |
| 10,797,660 B2 | 10/2020 | Delano et al. |
| 10,903,756 B2 | 1/2021 | Lee et al. |
| 10,978,947 B2 | 4/2021 | Amin et al. |
| 10,985,654 B2 | 4/2021 | Nomiyama et al. |
| 2006/0220622 A1 | 10/2006 | Yamanaka et al. |
| 2013/0234513 A1* | 9/2013 | Bayer ............... H02M 3/07 307/31 |
| 2020/0212807 A1* | 7/2020 | Das .................. H02M 3/158 |
| 2021/0075318 A1* | 3/2021 | Lee .................. H02M 3/07 |

* cited by examiner

FIG. 5

[VO Target voltage and operating mode]

| Minimum VO Target | Maximum VO Target | | |
|---|---|---|---|
| | VO_max < VIN*(1-a) | VIN*(1-a) ≤ VO_max < VIN*(1+a) | VIN*(1+a) ≤ VO_max < VIN*(1+b) | VIN*(1+b) < VO_max |
| VO_min < VIN | Buck | Buck-Boost | Buck-Boost | Buck-Boost |
| VO_min > VIN | - | Buck-Boost | Boost-Synchronous | Boost-Interleaving |

FIG. 7

| No | VA | VB | VC | VD | Operating mode |
|----|----|----|----|----|----------------|
| 1  | L  | L  | L  | L  | Buck           |
| 2  | L  | H  | L  | L  | Buck-Boost     |
| 3  | L  | X  | H  | L  | Buck-Boost     |
| 4  | L  | X  | X  | H  | Buck-Boost     |
| 5  | H  | X  | L  | L  | Buck-Boost     |
| 6  | H  | X  | H  | L  | Boost (Sync)   |
| 7  | H  | X  | X  | H  | Boost (Interleave) | operating mode

<Phase 1>

<Phase 2>

<Phase 1>

<Phase 2>

<Phase 3>

<Phase 1>

<Phase 2>

<Phase 1>

<Phase 2>

<Phase 1>

<Phase 2>

FIG. 19

| Minimum VO Target | Maximum VO Target | | |
|---|---|---|---|
| | $VO\_max < VIN(1-a)$ | $VIN(1-a) \leq VO\_max < VIN(1+a)$ | $VIN(1+b) \leq VO\_max$ |
| $VO\_min < VIN$ | Buck | Buck-Boost | Buck-Boost |
| $VO\_min > VIN$ | - | Buck-Boost | Boost |

Buck mode

Buck-boost mode

Buck mode

SWITCHING REGULATOR CIRCUIT

CROSS-REFERENCE TO RELATED APPLICATION

This application claims priority from Korean Patent Application No. 10-2021-0158838 filed on Nov. 17, 2021 in the Korean Intellectual Property Office, and all the benefits accruing therefrom under 35 U.S.C. 119, the contents of which are incorporated by reference herein in its entirety.

TECHNICAL FIELD

The present disclosure relates generally to a voltage conversion circuit, and more particularly, to a switching regulator circuit.

DISCUSSION OF RELATED ART

A supply voltage generated within an electronic device may drive various electronic components therein operating at different voltage levels, through use of voltage conversion circuitry that steps down or steps up the supply voltage. The supply voltage may also be dynamically stepped down to a given electronic component to reduce power consumption in low power operational modes. For example, when a digital circuit processing a digital signal operates in a mode requiring relatively low performance, a low-level supply voltage may be provided to the digital circuit, but when the digital circuit requires relatively high performance, a high-level supply voltage may be provided to the digital circuit. Accordingly, a switching regulator circuit capable of generating various levels of supply voltages may be used. The switching regulator circuit may be required to rapidly change a voltage level, yet have limited size constraints, and generate a supply voltage having reduced noise.

Miniaturized switching regulator circuits have been required for mobile devices such as Internet of Things (IoT) devices, true wireless stereo (TWS) devices, wireless sensor tags, and smartphones. The mobile devices include several semiconductor chips having various functions, such as a processor, an integrated circuit for communication, an integrated circuit for media processing, and a power management integrated circuit. Circuits within the semiconductor chips may require different respective powers according to an operating condition. To this end, a power management circuit providing multiple power levels/ranges is required.

A buck-boost voltage conversion circuit has been known as a power conversion technology that achieves high efficiency. The buck-boost voltage conversion circuit is used as a circuit for supplying power from a battery to each semiconductor chip.

However, the buck-boost voltage conversion circuit includes inductors occupying a large area on a substrate of a power management integrated circuit. When the number of inductors increases, it may restrict other design spaces of the power management integrated circuit. Therefore, it is desirable to minimize the number of inductors for this type of circuit.

SUMMARY

Aspects of the present disclosure provide a single in multi out (SIMO) converter circuit providing multiple outputs but using only one inductor in some embodiments, and a power management integrated circuit thereof.

Aspects of the present disclosure provide a switching regulator circuit having high efficiency, low ripple, and a fast response speed, and a power management integrated circuit thereof.

Aspects of the present disclosure also provide a switching regulator circuit having improved output voltage accuracy by operating adaptively to an error, and a power management integrated circuit thereof.

An embodiment of the present disclosure provides a switching regulator circuit comprising an input circuit including a first circuit part and a second circuit part, each including a plurality of input switches and configured to boost an input voltage and thereby generate an applied voltage. An inductor has a first end that receives the applied voltage. A multi-output end circuit includes a first unit output end and a second unit output end each connected to a second end of the inductor, where each of the first and second unit output ends includes at least one output switch. An error detection circuit may be configured to generate an error detection current and an error detection voltage based on a first output voltage of the first unit output end and a second output voltage of the second unit output end. An output switch controller may be configured to generate an output switch control signal for controlling the output switch based on the error detection voltage and the error detection current. A mode selector may be configured to select one of a plurality of operating modes based on the input voltage and respective target output voltage for the first or second unit output ends. An input switch controller may be configured to generate an input switch control signal for controlling the input switches based on the selected operating mode. The first circuit part may include a first flying capacitor and the second circuit part may include a second flying capacitor. The input switch controller may alternately charge the first flying capacitor and the second flying capacitor according to the input switch control signal, such that the input circuit outputs the applied voltage.

The control of the output switch in a given one of the unit output ends may control a turn-on time of that output switch, to thereby adjust the output voltage of that unit output end towards the target voltage associated therewith.

An embodiment of the present disclosure provides a switching regulator circuit comprising a first input circuit including a first circuit part and a second circuit part, each including a plurality of first input switches and a flying capacitor, boosting an input voltage, and outputting the boosted voltage as a first applied voltage, a first inductor receiving the first applied voltage, a second input circuit including a third circuit part and a fourth circuit part each including a plurality of second input switches, boosting an input voltage, and outputting the boosted voltage as a second applied voltage, a second inductor receiving the second applied voltage, a multi-output end circuit including a first unit output end, a second unit output end, and a third unit output end each connected to a common output end between the first inductor and the second inductor, each of the first to third unit output ends including at least one output switch, an error detection circuit generating first to third error detection currents and first to third error detection voltages based on first to third output voltages of the first to third unit output ends, respectively, an output switch controller generating an output switch control signal for controlling the output switch based on the first to third error detection currents, a mode selector configured to select operating modes based on the input voltage and respective target output voltages of the first through third unit output ends, and an input switch controller receiving a selection result of the mode selector and based thereon, generating an input switch control signal for controlling the first input switches and the second input switches.

An embodiment of the present disclosure provides a switching regulator circuit comprising an input circuit including a plurality of input switches, boosting an input voltage or a ground voltage, and outputting an applied voltage, an inductor receiving the applied voltage, a connection node switching circuit including a connection node switch connected between an output node of the inductor and a ground conductor, a multi-output end circuit including a first unit output end, a second unit output end, and a third unit output end connected to the output node of the inductor, each of the first to third unit output ends including at least one output switch, an error detection circuit generating first to third error detection currents and first to third error detection voltages based on first to third output voltages, respectively, of the first to third unit output ends, an output switch controller generating an output switch control signal for controlling the output switch based on the first to third error detection currents, a mode selector configured to select operating modes based on the input voltage and respective target output voltages of the first through third unit output ends, and an input switch controller configured to receive a selection result of the mode selector and based thereon, generate an input switch control signal for controlling the input switch and the connection node switch.

However, aspects of the present disclosure are not restricted to those set forth herein. The above and other aspects of the present disclosure will become more apparent to one of ordinary skill in the art to which the present disclosure pertains by referencing the detailed description of the present disclosure given below.

BRIEF DESCRIPTION OF THE DRAWINGS

The above and other aspects and features of the present disclosure will become more apparent by describing in detail exemplary embodiments thereof with reference to the attached drawings. Various elements of the same or similar type may be distinguished by annexing the reference label with an underscore/dash and second label that distinguishes among the same/similar elements (e.g., _1, _2), or directly annexing the reference label with a second label (e.g., VO1, VON). However, if a given description uses only the first reference label (e.g., VO), it is applicable to any one of the same/similar elements having the same first reference label irrespective of the second label.

FIG. 5 is a table for describing an operating mode setting condition of the switching regulator circuit according to some exemplary embodiments.

FIG. 7 is a table for describing an operating mode setting condition of an input switch controller according to some exemplary embodiments.

FIG. 19 is a table illustrating operating modes of the switching regulator circuit of FIG. 18.

DETAILED DESCRIPTION OF EMBODIMENTS

Hereinafter, various exemplary embodiments of the present disclosure will be described with reference to the accompanying drawings.

Herein, for brevity, once a particular voltage, current, signal or circuit element is first introduced by a name and a label (e.g., an input voltage VIN), it may be subsequently referred to by just the label (e.g., VIN) or an abbreviated form of the name followed by the label.

Herein, when a first circuit component ("component"), e.g., a switch, a capacitor, etc.) is said to be "connected to" a second circuit component (e.g., each connected to a common circuit node in a schematic), the first and second components may be directly or indirectly connected. When directly connected, the first and second components are connected without any intervening component ((e.g., each connected to a common circuit node in a schematic). If the context refers to a drawing showing a direct connection example, it is understood that the addition of an intervening component may be possible in an alternative embodiment to that illustrated.

Herein, "connected to ground" or a like phrase refers to a connection to a ground conductor (a conductor having a reference potential) within the circuit/device being described. One example of a ground is a power ground. Similarly, "connected to a supply voltage" such as "connected to VDD" means connected to a circuit node at which the supply voltage is applied.

Figure 1:
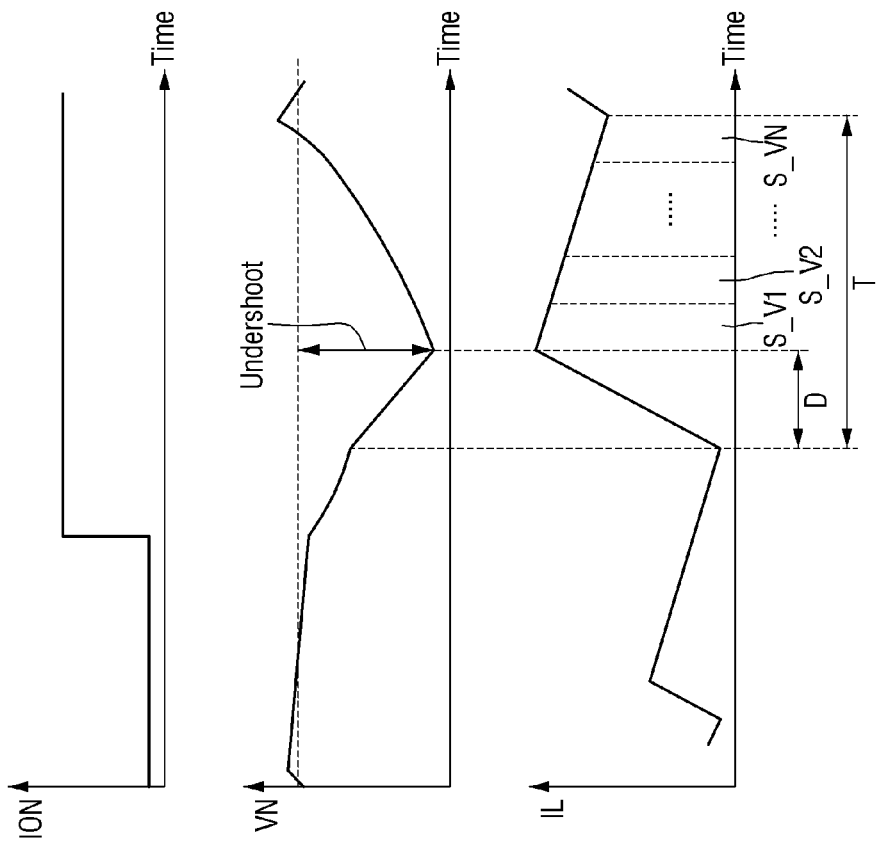
FIG. 1 depicts waveforms for describing a comparative example of a single in multi out (SIMO) converter according to a comparative example.

FIG. 1 illustrates waveforms for describing a comparative example of a single in multi out (SIMO) converter according to a comparative example. An example of a conventional SIMO converter circuit requires a ramp-up time D for a current to be ramped up to an inductor. In this case, during the ramp-up time D, the SIMO converter circuit does not transfer electric charges charged in the inductor to output sections of the converter circuit ("output ends") by turning off a switch connected to the output ends. However, the ramp-up time may also increase based on an amount of load current provided to the inductor. In this case, a large undershoot may occur in an output voltage VN of the output ends.

Meanwhile, since power may not be transferred to respective output ends during the ramp-up time, a high inductor peak current is required. Referring to Equation (1), a value obtained by multiplying a value obtained by dividing the total current sum of average output currents (I1, I2, . . . , IN) of the respective output ends by the remaining time (1-D) obtained by subtracting the ramp-up time from one duty by the number (N) of output ends is an average output current of all output ends. In Equation (1), when the number (N) of output ends and a ramp-up duty ratio (D) are high, the average output current ($I_{L\_ave}$) also becomes high.

$$I_{L\_ave} = N(I_1 + I_2 + \ldots + I_N)/(1-D) \quad (1)$$

Referring to Equation (2), when a root mean square (RMS) current ($I_{RMS}$) of the inductor with respect to the ramp-up time becomes high, power loss may become large. In Equation (2), $P_{LOSS}$ is power loss, $R_{DCR}$ is a direct current (DC) resistance of the inductor, and $I_{RMS}$ is an RMS current of the inductor.

$$P_{Loss} = I_{RMS}^2 R_{DCR} \quad (2)$$

There is also a method of periodically detecting an error in order to reduce the undershoot of the output voltage. However, such a method may not cope with a load transient phenomenon until the next error detection cycle, and when a detection cycle frequency is increased, a larger bias current needs to be provided to the inductor.

Figure 2:
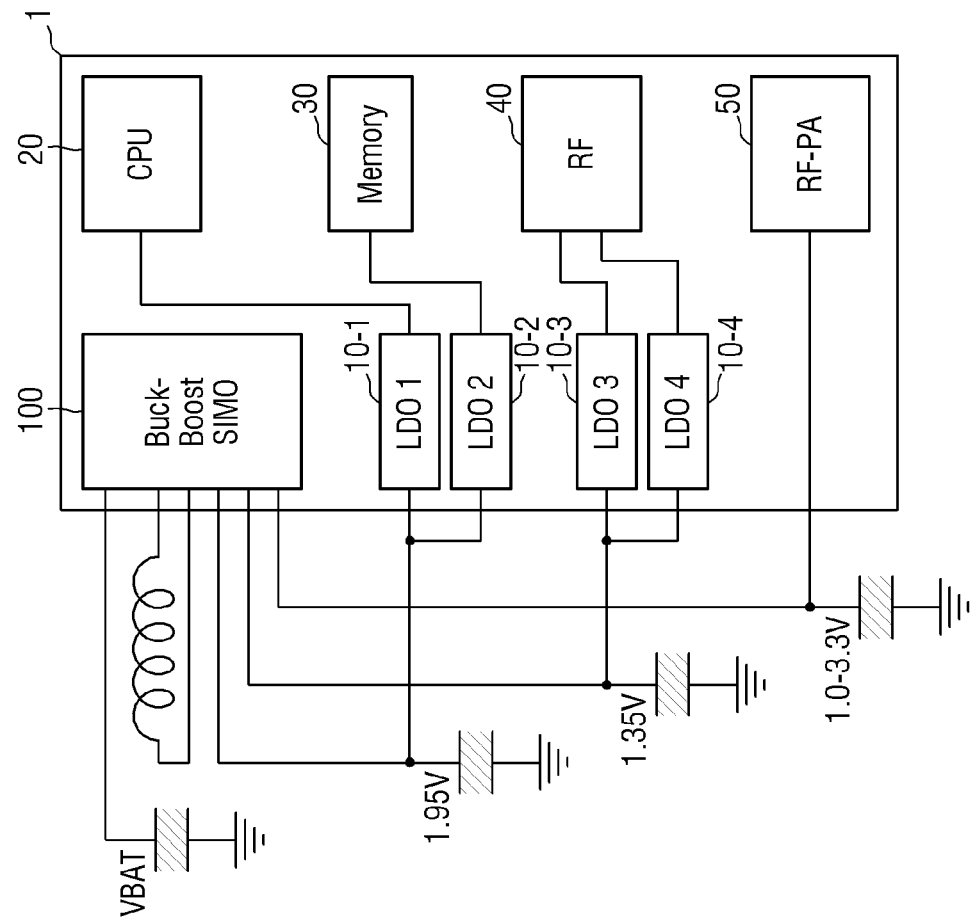
FIG. 2 is a diagram illustrating a semiconductor device according to some exemplary embodiments.

FIG. 2 is a diagram illustrating a semiconductor device according to some exemplary embodiments.

Referring to FIG. 2, a semiconductor device 1 includes a SIMO converter 100, low drop out driver circuits (LDO) 10-1 to 10-4, a central processing unit (CPU) 20, a memory 30, a radio frequency (RF) module 40, and an RF-power amplifier (PA) module 50.

The semiconductor device 1 may be a device including a communication function. For example, the semiconductor device 1 may include at least one of smartphones, tablet personal computers (PCs), mobile phones, video phones, e-book readers, desktop PCs, laptop PCs, netbook computers, personal digital assistants (PDAs), portable multimedia players (PMPs), MP3 players, mobile medical devices, cameras, or wearable devices (e.g., head-mounted-devices (HMDs) such as electronic glasses, electronic garments, electronic bracelets, electronic necklaces, electronic appcessories® (a physical device and counterpart application for a mobile device), electronic tattoos, or smart watches).

The semiconductor device 1 may be a smart home appliance having a communication function. Some examples of the smart home appliance may include, a television (TV), a digital video disk (DVD) player, an audio player, a refrigerator, an air conditioner, a cleaner, an oven, a microwave oven, a washing machine, an air cleaner, a set-top box, a TV box (e.g., Samsung HomeSync™, Apple TV™, or Google TV™), game consoles, an electronic dictionary, an electronic key, a camcorder, and/or an electronic picture frame.

Further examples of the semiconductor device 1 may include at least one of various medical devices (e.g., a magnetic resonance angiography (MRA) device, a magnetic resonance imaging (MRI) device, a computed tomography (CT) device, an imaging device, an ultrasound machine, etc.), navigation devices, global positioning system (GPS) receivers, event data recorders (EDRs), flight data recorders (FDRs), vehicle infotainment devices, marine electronic devices (e.g., marine navigation systems and gyro compasses, etc.), avionics, security devices, vehicle head units, industrial or household robots, automatic teller's machines (ATMs) of financial institutions, or point of sales (POS) systems of stores.

The SIMO converter circuit 100 may be a switching regulator circuit. The SIMO converter circuit 100 embodied as switching regulator circuit may generate an output voltage having a level suitable for each of functional circuits 20 to 50 from a battery supply voltage VBAT provided from a battery by turning on/off at least one switch to adjust a path of an inductor current IL passing through an inductor L. An exemplary configuration of the switching regulator circuit 100 will be described later with reference to FIG. 3.

The LDO circuits 10-1 to 10-4, which are linear regulators, are connected to the battery to perform more precise voltage conversion for the battery supply voltage VBAT. For example, the switching regulator circuit 100 may perform primary voltage conversion on the battery supply voltage VBAT and the LDO circuits 10-1 to 10-4 may perform secondary voltage conversion on the battery supply voltage VBAT to generate output voltages for the respective components 20 to 50.

The CPU 20 controls the overall operation of the semiconductor device 1. The memory 30 may be an operation memory of the semiconductor device 1, or may be a non-volatile memory storing parameters, commands, and the like, necessary for an operation of the semiconductor device 1. Alternatively, the memory 30 may be a non-volatile memory device storing data.

The RF module 40 performs data encoding and modulation. The RF-PA module 50 reflects a preset frequency in a transmission signal generated by the RF module 40 to generate a low-power RF signal, and amplifies the low-power RF signal into an analog signal having a preset power intensity.

Figure 3:
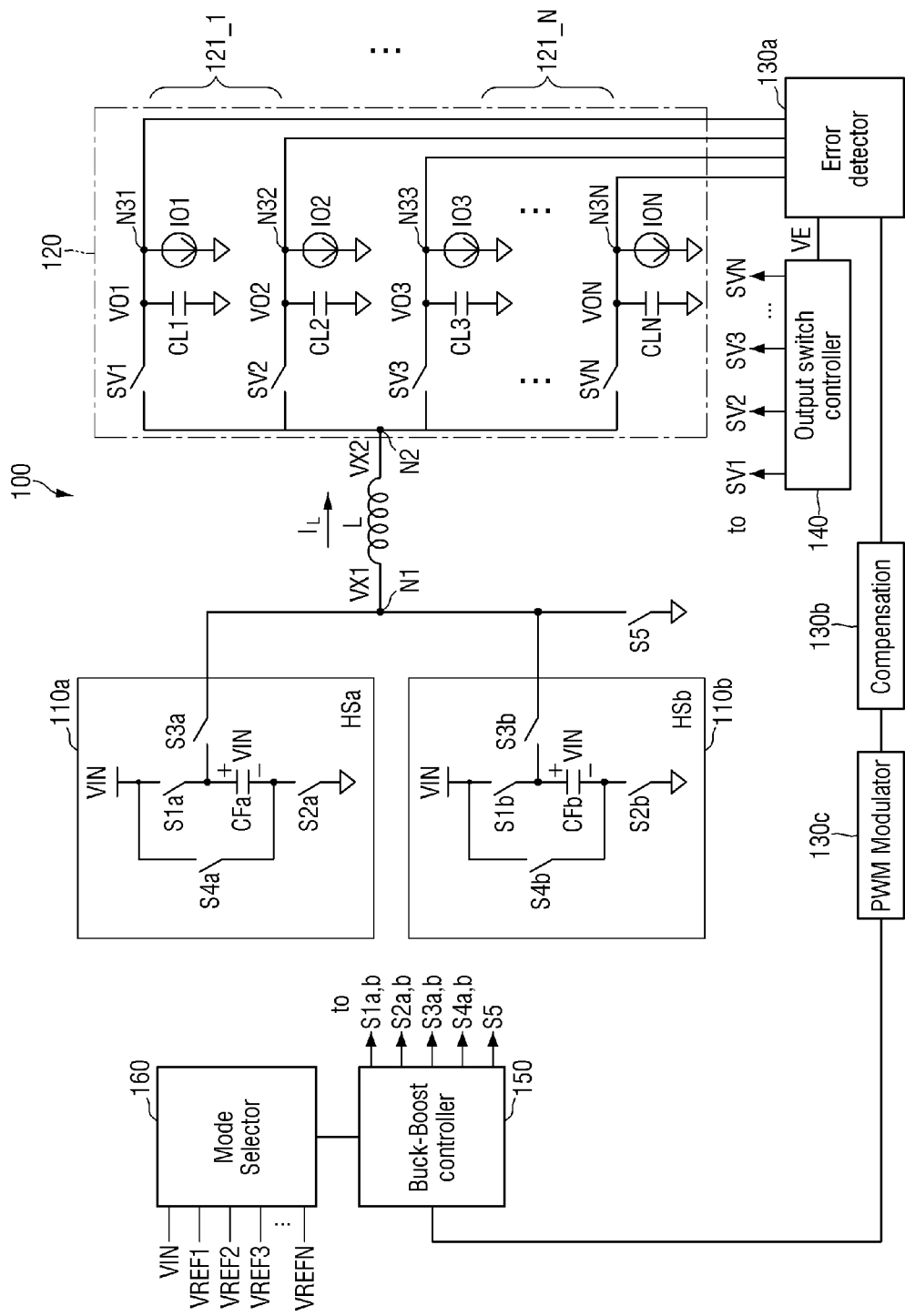
FIG. 3 is a circuit diagram illustrating a switching regulator circuit according to some exemplary embodiments.
Figure 4:
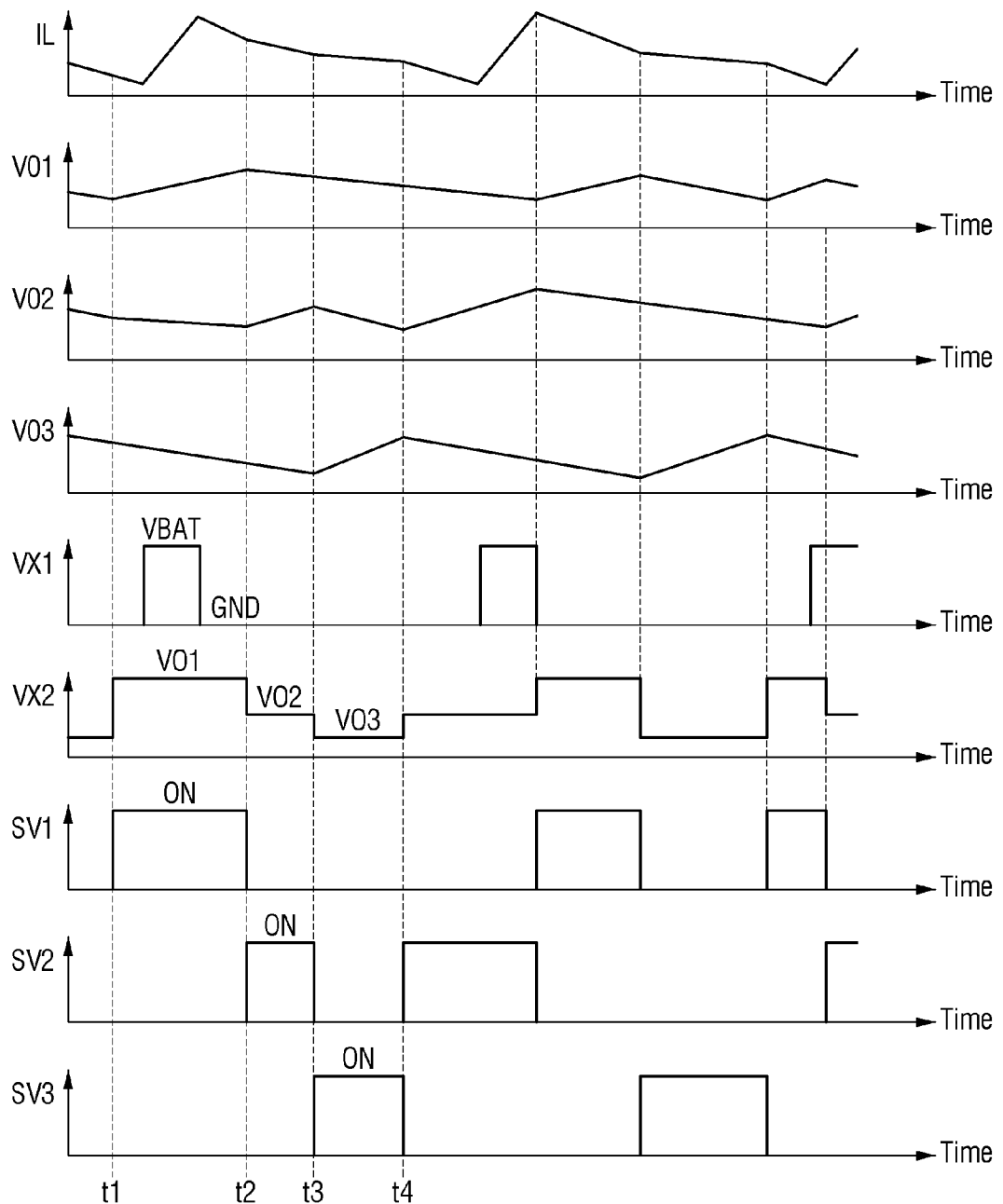
FIG. 4 is a timing diagram for describing an operation of the switching regulator circuit of FIG. 3.

FIG. 3 is a circuit diagram illustrating a switching regulator circuit according to some exemplary embodiments, and FIG. 4 is a timing diagram for describing an operation of the switching regulator circuit of FIG. 3.

Referring to FIG. 3, the switching regulator circuit 100 may operate in any one of a plurality of operating modes according to a target level of an output voltage VO (any one of VO1 to VON, where N is two or more). The operating modes of the switching regulator circuit 100 may include a buck mode, a buck-boost mode, a synchronous boost mode, and an interleaving boost mode.

The switching regulator circuit 100 in the buck mode may generate an output voltage VO of which a level is lower than a level of an input voltage VIN, and may be referred to as a buck (or step-down) converter. The switching regulator circuit 100 in the boost mode may generate an output voltage VO of which a level is higher than the level of the input voltage VIN, and may be referred to as a boost (or step-up) converter. In addition, the boost converter may operate in a plurality of boost modes. The switching regulator circuit 100 in the buck-boost mode may generate an output voltage VO (any one of VO1 to VON) of which a level is lower than or higher than the level of the input voltage VIN.

The switching regulator circuit 100 may include an input circuit 110: 110a and 110b, an inductor L, a multi-output "end circuit" 120 (an output circuit portion of the switching regulator circuit that provides multiple output voltages at respective output nodes N31-N3N), an error detection circuit 130a, a compensation circuit 130b, a pulse width modulation circuit 130c, an output switch controller 140, an input switch controller (interchangeably, "buck-boost controller") 150, and a mode selector 160.

The input circuit 110 may include a plurality of circuit parts 110a and 110b and a switch S5. According to some exemplary embodiments, a first circuit part 110a includes a plurality of input switches S1a to S4a and a flying capacitor (often referred to as a charge pump) CFa. A second circuit part 110b includes a plurality of switches S1b to S4b and a flying capacitor CFb. The switching regulator circuit 100 may be set to and operated in any one of the buck mode, the buck-boost mode, the synchronous boost mode, and the interleaving boost mode by controlling the switching of the first circuit part 110a and the second circuit part 110b according to the target level of the output voltage VO.

The first circuit part 110a according to some exemplary embodiments will be described in detail. The switch S1a is connected to a power supply end to which the input voltage VIN is applied and a first end (that may be referred to as an output end of the first circuit part) of the flying capacitor CFa, and the input switch S3a is connected between the first end of the flying capacitor CFa and a node N1 (i.e., one end of the inductor L). The switch S2a between a second end of the flying capacitor CFa and ground, and the switch S4a is connected between the power supply (input voltage) VIN terminal and the second end of the flying capacitor CFa. The second circuit part 110b has the same circuit configuration as the first circuit part 110a, such that a detailed description thereof is omitted. In this case, the input voltage VIN may be the battery input voltage VBAT described with reference to FIG. 2.

Each of the output ends of the input switches S3a and S4a is connected to a common node N1, and the switch S5b is connected between node N1 and ground. A single inductor L is connected between the node N1 and a node N2.

The multi-output circuit end 120 is connected between an output end of the inductor L, which is the node N2, and the error detection circuit 130a. The multi-output end circuit 120 includes at least one "unit output end" 121_1 to 121_N, generating independent output voltages VO1 to VON for the respective functional circuits 20 to 50 (see FIG. 1). The output voltages VO1 to VON have supply voltage levels required by the respective functional circuits 20 to 50 (see FIG. 1). Accordingly, it is desired for each of the output voltages VO1 to VON to be in a respective target voltage range (e.g., according to the table of FIG. 5).

For example, a first unit output end includes a switch SV1 connected between the node N2 and an output node N31, a load capacitor CL1 connected between the output node N31 and ground, and a current source IO1 connected between the output node N31 and ground. For instance, the multi-output end circuit 120 may include first to Nth unit output ends 121_1 to 121_N, where N is illustrated as four or more in FIG. 3, but in general, N may be two or more, and each unit output end (e.g., a k-th unit output end) includes a switch SVk, a capacitor CLk, and a current source (IOk). Here, k is a natural number.

The error detection circuit 130a receives output voltages VO1 to VON from output nodes N31 to N3N of the unit output ends and generates an error detection voltage VE.

The error detection voltage VE is output to the input switch controller 150 and the output switch controller 140, and becomes a basic signal for controlling turn-on/off of the circuit part 110a or the switches SV1, SV2, . . . , SVN included in any one unit output end.

The output switch controller 140 controls the turn-on/off of the switches SV1 and SV2 to SVN of the unit output ends based on the error detection voltage VE. For example, suppose that an output voltage VOk of a unit output end 121_k is lower than the target voltage for the output end 121_k by the largest offset among all of the offsets for the output voltages VO1 to VON (where each offset may be measured with respect to a respective reference voltage VOREF1 to VOREFN). In this case, the turn-on duration of the switch SVk may be set longer than the turn-on durations of each of the other switches SV, which builds up charge within the capacitor CLk, so that the voltage VOk can be quickly raised to a voltage close to the target voltage (e.g., near the center of a target voltage range for the output end 121_k). An analogous dynamic adjustment may occur when an output voltage VOk is higher than a preset maximum voltage within the target range. In this manner, the output voltages VO1 to VON may be dynamically adjusted, with priority given to the output voltage that deviates furthest from its respective target voltage. In addition, the mode selector 160 may set the operating mode differently for each of the unit output ends 121_1 to 121_N based on the target voltage (as explained below with respect to FIG. 5).

The input switch controller 150 outputs switch signals of the circuit parts 110a and 110b adjusted according to a control signal of the mode selector 160. As described later, the input switch controller 150 may generate switching control signals of the input switches S1a, S2a, S3a, and S4a so that the flying capacitor CFa of the circuit part (e.g., the first circuit part 110a) operates as a charge pump by the input switches S1a, S2a, S3a, and S4a.

Referring to FIG. 4, the switching operation of the circuit parts 110a and 110b operates independently of the switching operation of the multi-output end circuit 120 in the switching regulator circuit 100. In other words, the circuit parts 110a and 110b and the multi-output end circuit 120 operate asynchronously. A turn-on sequence of an output switch SV operates according to an output voltage drop of each unit output end 121. Accordingly, the switching of an output switch SV is not synchronized with a reference clock signal CK, and may be quickly turned on according to the error detection voltage VE based on an output voltage VO of each unit output end.

As an example, when the switching regulator circuit 100 operates in the buck mode as illustrated in FIG. 4, the first circuit part 110a and the second circuit part 110b may operate in the buck-boost mode or the boost mode. However, the multi-output end circuit 120 operates according to the error detection voltage based on the output voltage of each unit output end 121 regardless of an operating mode of the input circuit 110.

The multi-output end circuit 120 may operate as follows: only a single one of first through Nth output switches SV1-SVN is turned on. (In FIG. 3, N is four or more, but in FIG. 4, the components and voltages of the unit output ends 121_1 to 121_3 are shown as an example, and described hereafter.). In this case, one of the output voltages VO1-VO3 is built up by charges accumulated in a respective output load capacitor CL1-CL3 when the corresponding output switch (any one of the output switches SV1-SV3) is turned on, and thus, a voltage level rises. In the illustrated example, when the first output switch SV1 is turned on, the output voltage VO1 rises, and the output voltages VO2-VO3 of the other unit output ends 121_2 and 121_3 fall. Subsequently, when SV2 is turned on, the output voltage VO2 rises, and the output voltages VO1 and VO3 fall. Subsequently, SV3 is turned on, VO3 rises, and VO1 and VO2 fall.

Meanwhile, describing an output voltage VX1 of the node N1 tied to the input end of inductor L and an input voltage VX2 of the node N2 tied to the output end of inductor L, the output voltage VX1 generated by the circuit parts 110a and 110b in the buck mode corresponds to the battery input voltage VBAT. However, the input voltage VX2 input to the multi-output end circuit 120 is generated as a higher voltage (for example, VO1) or a lower voltage VO3, as illustrated in FIG. 4, than VBAT according to the inductor current IL in the inductor L. At this time, the input circuit 110 supplies a continuous output current as the inductor current IL. An operating mode of the input circuit 110 will be described later with reference to FIGS. 5 to 7.

Figure 6:
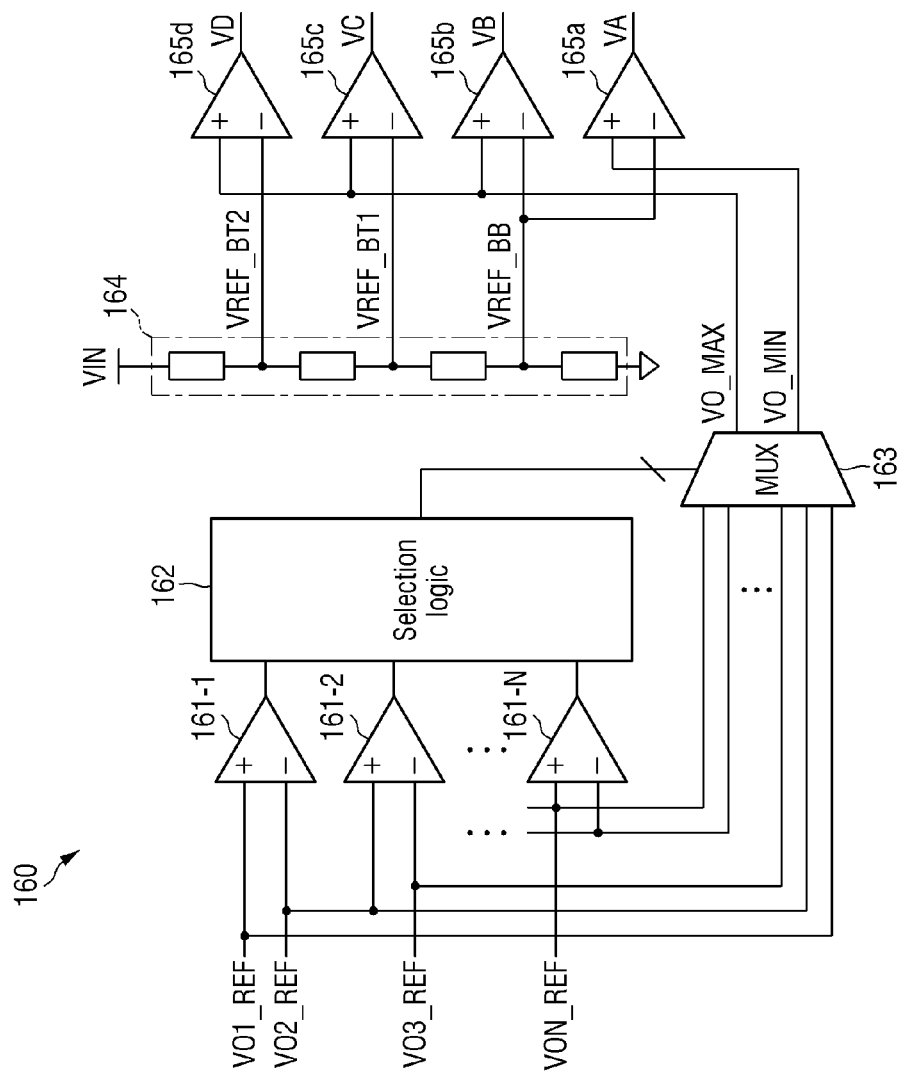
FIG. 6 is a circuit diagram illustrating a mode selector according to some exemplary embodiments.

FIG. 5 is a table for describing an operating mode setting condition of the switching regulator circuit according to some exemplary embodiments, FIG. 6 is a circuit diagram illustrating a mode selector according to some exemplary embodiments, and FIG. 7 is a table for describing an operating mode setting condition of an input switch controller according to some exemplary embodiments.

The mode selector 160 illustrated in FIG. 6 selects one of a plurality of operating modes according to a relationship between the input voltage VIN and the output voltage VO in the table of FIG. 5, and switching of the circuit parts 110a and 110b is controlled as illustrated in FIG. 7 according to the selected operating mode. The plurality of operating modes may include, for example, a buck mode, a buck-boost mode, a synchronous-boost mode, and an interleaving-boost mode.

The mode selector 160 may compare the input voltage VIN with a minimum value of an "output reference voltage", e.g., a minimum output voltage VO_min (the minimum of VO measured during a most recent measurement interval) of each unit output end 121. In addition, the mode selector 160 compares a maximum value of the output reference voltage, e.g., a maximum output voltage VO_max, of each unit output end 121 with an input voltage (e.g., VIN(1−a), VIN(1+a), or VIN(1+b)), which may be a multiple (greater or less than 1) of VIN. In this case, VIN(1−a) refers to a (1−a) multiple of the input voltage VIN, VIN(1+a) refers to a (1+a) multiple of the input voltage VIN, and VIN(1+b) refers to a (1+b) multiple of the input voltage VIN. It is noted that the constants a and b (e.g., 0.1 and 0.5, respectively) may be variously set according to characteristics of a power management integrated circuit.

For example, for a given unit output end 121_i, the buck mode is selected when VO_min<VIN and VO_max<VIN (1−a) for that unit output end 121_i.

For example, the buck-boost mode is selected when VO_min<VIN and any of the other conditions for the maximum output voltage in the table of FIG. 5 are met: (i) VIN(1−a)<VO_max<VIN(1+b) or greater than the input voltage (VIN(1+b)<VO_max).

For example, the synchronous boost mode (Boost-Synchronous) is selected when the minimum output voltage of the unit output end is greater than the input voltage (VO_min>VIN) and the maximum output voltage of the unit output end is slightly greater than the input voltage (VIN (1+a)<VO_max<VIN(1+b)).

For example, the interleaving-boost mode (Boost-Interleaving) is selected when the minimum output voltage of the unit output end is greater than the input voltage (VO_min>VIN) and the minimum output voltage of the unit output end is greater than the input voltage (VIN(1+b) <VO_max).

In FIG. 6, according to some exemplary embodiments, the mode selector 160 includes comparators 161-1 to 161-N, a selection circuit 162, a multiplexer 163, a division impedance 164, and output comparators 165a to 165d.

The comparators 161-1 to 161-N compare preset output reference voltages VO1_REF to VON_REF (which may be the same as VREF1 to VREFN, respectively, in FIG. 3) with each other (N is generally 2 or more) and output comparison results through the selection circuit 162, and the multiplexer 163 selects and outputs any one of the output reference voltages according to the comparison results. The preset output reference voltages VO1_REF to VON_REF may have voltage levels preset with respect to the output voltage VO of each of the functional circuits 20 to 50.

In this case, the output reference voltages selected and output by the multiplexer 163 are the maximum output voltage VO_max having a maximum value and the minimum output voltage VO_min having a minimum value among the preset output reference voltages of the multi-output end circuit 120.

The division impedance 164 is connected in series between a power supply and ground to generate one or more divided reference voltages VREF_BB, VREF_BT1, and VREF_BT2 from the input voltage VIN. The divided reference voltage may be, for example, a value in which the multiple such as (1−a), (1+a), or (1+b) described with reference to FIG. 5 is reflected in the input voltage VIN.

The output comparators 165a to 165d compare the divided reference voltages VREF_BT2, BREF_BT1, and VREF_BB with the maximum output voltage VO_max or compare the divided reference voltage VREF_BB with the minimum output voltage VO_min. The output comparators 165a to 165d may output mode detection signals VA, VB, VC, and VD to the input switch controller 150 as comparison results between the maximum output voltage or the minimum output voltage and the divided reference voltages.

Referring to FIGS. 5 and 7, the input switch controller 150 may select one of the plurality of operating modes based on the mode detection signals VA, VB, VC, and VD of the output comparators 165a to 165d. For example, the mode detection signal may have the number of bits corresponding to the plurality of operating modes. As an example, the number of operating modes is seven in an example illustrated in FIG. 5, and thus, the mode detection signal may be 4 bits. Each of the most significant bit to the least significant bit of the mode detection signal may be in a logic high state or a logic low state according to outputs of the output comparators 165a to 165d.

The mode detection signal VA indicates whether or not the input voltage has a level greater than the minimum output voltage (VIN>VO_min or VIN<VO_min), and the mode detection signals VB, VC, and VD may be comparison results between the maximum output voltage VO_max and the input voltages VIN to which predetermined multiples a and b are applied.

For example, when the input voltage VIN is greater than the minimum output voltage VO_min (VO_min<VIN), the mode detection signal VA is [L], and when the maximum output voltage VO_max is smaller than (1−a) times the input voltage (VO_max)<VIN(1−a)), the mode detection signals VB, VC, and VD are output as [L, L, L], and the input switch controller 150 may detect the buck mode and control switching signals of the switches S1a,b, S2a,b, S3a,b, S4a,b, and S5 (in case of No. 1 in FIG. 7).

For example, when the input voltage VIN is greater than the minimum output voltage VO_min (VO_min<VIN), the mode detection signal VA is [L], and when the maximum output voltage VO_max exceeds (1−a) times the input voltage and is smaller than (1+a) times the input voltage (VIN(1−a)<VO_max)<VIN(1+a)), the mode detection signals VB, VC, and VD are output as [H, L, L], and the input switch controller 150 may detect the buck-boost mode and control the switching signals of the switches S1*a,b*, S2*a,b*, S3*a,b*, S4*a,b*, and S5 (in case of No. 2 in FIG. 7).

For example, when the input voltage VIN is greater than the minimum output voltage VO_min (VO_min<VIN), the mode detection signal VA is [L], and when the maximum output voltage VO_max exceeds (1+a) times the input voltage and is smaller than (1+b) times the input voltage (VIN(1+a)<VO_max)<VIN(1+b)), the mode detection signals VB, VC, and VD are output as [X, H, L], and the input switch controller 150 may detect the buck-boost mode and control the switching signals of the input switches S1*a,b*, S2*a,b*, S3*a,b*, S4*a,b*, and S5 (in case of No. 3 in FIG. 7).

For example, when the input voltage VIN is greater than the minimum output voltage VO_min (VO_min<VIN), the mode detection signal VA is [L], and when the maximum output voltage VO_max exceeds (1+b) times the input voltage (VIN(1+b)<VO_max), the mode detection signals VB, VC, and VD are output as [X, X, H], and the input switch controller 150 may detect the buck-boost mode and control the switching signals of the input switches S1*a,b*, S2*a,b*, S3*a,b*, S4*a,b*, and S5 (in case of No. 4 in FIG. 7).

For example, when the input voltage VIN is smaller than the minimum output voltage VO_min (VO_min>VIN), the mode detection signal VA is [H], and when the maximum output voltage VO_max exceeds (1−a) times the input voltage and is smaller than (1+a) times the input voltage (VIN(1−a)<VO_max)<VIN(1+a)), the mode detection signals VB, VC, and VD are output as [X, L, L], and the input switch controller 150 may detect the buck-boost mode and control the switching signals of the input switches S1*a,b*, S2*a,b*, S3*a,b*, S4*a,b*, and S5 (in case of No. 5 in FIG. 7).

For example, when the input voltage VIN is smaller than the minimum output voltage VO_min (VO_min>VIN), the mode detection signal VA is [H], and when the maximum output voltage VO_max exceeds (1+a) times the input voltage and is smaller than (1+b) times the input voltage (VIN(1+a)<VO_max)<VIN(1+b)), the mode detection signals VB, VC, and VD are output as [X, H, L], and the input switch controller 150 may detect the synchronous-boost mode and control the switching signals of the input switches S1*a,b*, S2*a,b*, S3*a,b*, S4*a,b*, and S5 (in case of No. 6 in FIG. 7).

For example, when the input voltage VIN is smaller than the minimum output voltage VO_min (VO_min>VIN), the mode detection signal VA is [H], and when the maximum output voltage VO_max exceeds (1+b) times the input voltage (VIN(1+b)<VO_max), the mode detection signals VB, VC, and VD are output as [X, X, H], and the input switch controller 150 may detect the interleaving-boost mode and control the switching signals of the input switches S1*a,b*, S2*a,b*, S3*a,b*, S4*a,b*, and S5 (in case of No. 7 in FIG. 7).

Figure 8:
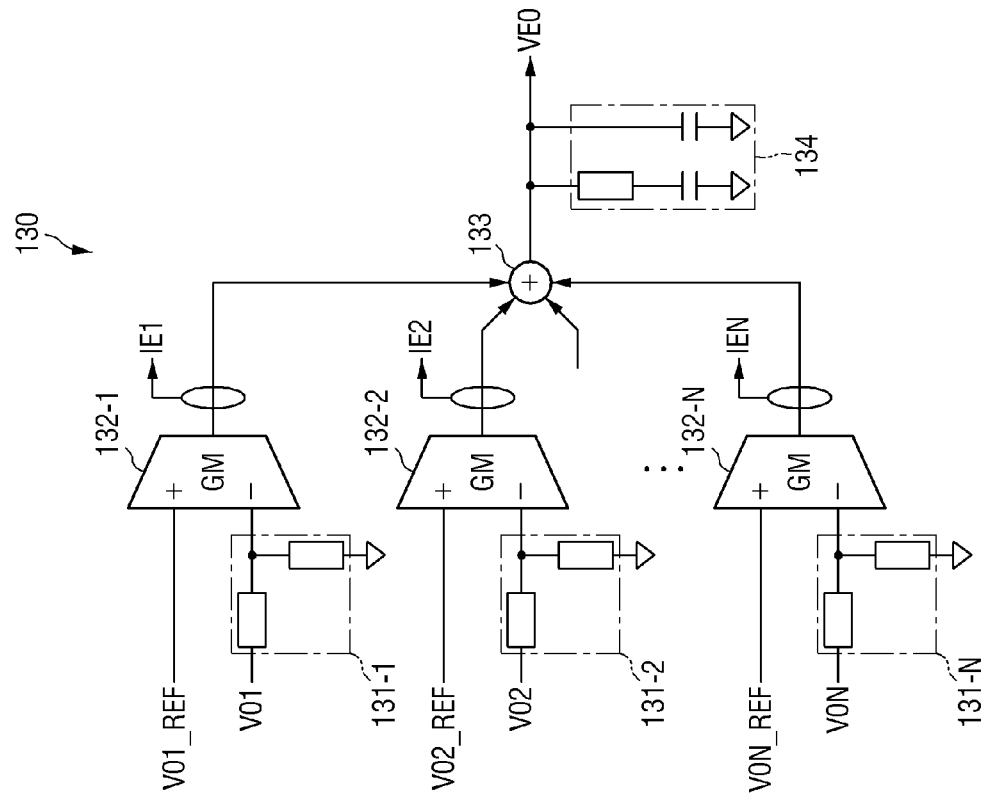
FIG. 8 is a circuit diagram illustrating an error detection circuit and a compensation circuit according to some exemplary embodiments.
Figure 9:
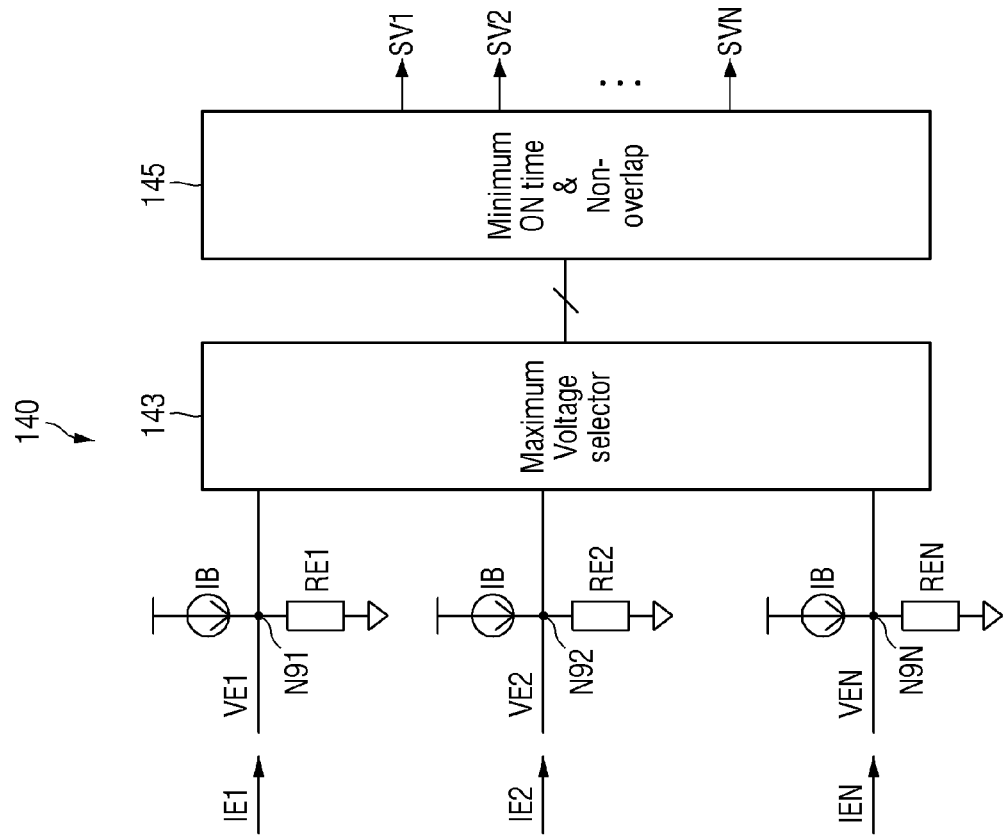
FIG. 9 is a circuit diagram illustrating an output switch controller according to some exemplary embodiments.

FIG. 8 is a circuit diagram illustrating an error detection circuit and a compensation circuit according to some exemplary embodiments. FIG. 9 is a circuit diagram illustrating an output switch controller according to some exemplary embodiments.

Referring to FIG. 8, according to some exemplary embodiments, the error detection circuit 130*a* may include a plurality of unit error amplifiers 132-1 to 132-N and a current addition circuit 133, and the compensation circuit 130*b* of FIG. 3 may be a compensation circuit 134 connected to an output end of an error detection voltage VE0 of FIG. 8.

The unit error amplifiers 132-1 to 132-N compare the preset output reference voltages VO1_REF to VON_REF described above with reference to FIG. 6 with the output voltages VO1 to VON of the respective unit output ends to generate error detection currents IE1 to IEN. The error detection circuit 130*a* may further include voltage division circuits 131-1 to 131-N. The voltage dividing circuits 131-1 to 131-1N may adjust the output voltages VO1 to VON in a voltage level range according to ratios between the output voltages and the reference voltages.

The current addition circuit 133 outputs a summed error detection current obtained by adding all of the respective error detection currents IE1 to IEN. The summed error detection current is converted into a voltage signal by the compensation circuit 134 and is output as a summed error detection voltage VEO. The compensation circuit 134 may be a circuit including a resistor and/or capacitors.

Referring to FIG. 9, the output switch controller 140 receives the error detection currents IE1 to IEN from the error detection circuit 130*a*, and generates and outputs output switch control signals for the output switches SV1 and SV2 to SVN.

The output switch controller 140 includes a current source IB inputting a preset current corresponding to each error detection current IE, a resistor RE for generating a voltage signal from the error detection current IE, a maximum voltage selection circuit 143, and a minimum on-time adjustment circuit 145.

The current sources providing a bias current $I_{bias}$ may each be connected between a power supply VDD and error detection input nodes N91, N92, ... N9N, the error detection currents IE are input to the error detection nodes N91, N92, ... N9N, and resistors RE1, RE2, ..., REN are connected between the error detection input nodes N91, N92, ..., N9N and ground.

Referring to Equation (3), an error detection voltage (e.g., an error detection voltage $V_{EN}$ of the error detection input node N9N) is generated by adding the bias current $I_{bias}$ to the error detection current $I_{EN}$ and then applying the resistor $R_{EN}$. In Equation (3), the bias current $I_B$ is an additional offset current of the error detection input node N9N, and a voltage is $V_{OFFSET}$. (The same equations herein associated with the unit output end 121_N apply to each of the other unit output ends 121*i* (i=to (N−1)), where "i" is substituted for N.)

$$V_{EN}=R_{EN}(I_{EN}+I_{bias})=R_{EN}I_{EN}+V_{OFFSET} \quad (3)$$

The error detection voltage $V_{EN}$ is based on the error detection current $I_{EN}$ at the Nth unit output end node 121_N of FIG. 8, and may thus be expressed as in Equation (4).

$$\Delta V_{EN}=R_{EN}I_{EN}=R_{EN}G_M(V_{ON\_REF}-V_{ON}/Z_{RATIO}) \quad (4)$$

The error detection current $I_{EN}$ is a value obtained by applying the error amplifier 132 and a transconductance gain GM to a value obtained by dividing a difference ($V_{ON\_REF}-V_{ON}$) between the preset output reference voltage VREF and the output voltage VO by a resistance 131-N division ratio ($Z_{RATIO}$).

Referring to Equation (5), an output error ratio ($D_{ERR}$) may be expressed as follows:

by a value obtained by dividing a value obtained by dividing a value obtained by subtraction of a current output voltage ($V_{ON}$) from an output reference voltage ($VN_{REF}$) for an N-th unit output end 121_N by the resistance division ratio ($Z_{RATIO}$) by an output reference voltage ($V_{ON_{REF}}$) of a current node. Here, when Equation (5) is substituted into Equation (4), a change amount ($\Delta V_{EN}$) of the error detection voltage may be summarized as Equation (6).

$$D_{ERR} = -(V_{ON_{REF}} - V_{ON}/Z_{RATIO})/V_{ON\ REF} \quad (5),$$

where ($Z_{RATIO}$) is the resistance division ratio, VON is the output voltage for unit output end 121_N, and VNREF is the output reference voltage associated with the unit output end 121_N.

When Equation (5) is substituted into Equation (4), a change amount ($\Delta V_{EN}$) of the error detection voltage may be summarized as Equation (6):

$$|D_{ERR}| = |\Delta V_{EN}/(R_{EN} G_M V_{ON_{REF}})| \quad (6)$$

In circuit design, a maximum error rate is different for each power rail supplying a source voltage of a circuit, and thus, it is more practical to control the error ratio ($D_{ERR}$) compared to the change amount ($\Delta V_{EN}$) of the error detection voltage in an actual environment.

In addition, when transconductance gains GM of the respective error amplifiers 132-1 to 132-N are the same, matching performance of error measurements for each unit output end 121 is facilitated. Accordingly, in Equation (6), a resistance impedance $R_{EN}$ may be selected according to the output error ratio $D_{ERR}$ required for design. For example, to obtain an output having a high precision, the error detection voltage $V_{EN}$ needs to rise rapidly with respect to a voltage error, and thus, a high resistance value $R_{EN}$ is required.

The maximum voltage selection circuit 143 selects a node of a maximum error detection voltage among the error detection voltages VE1 to VEN of the respective unit output ends. The maximum voltage selection circuit 143 continuously compares the error detection voltages VE1, VE2, . . . , VEN of different unit output ends with each other and outputs comparison results to the minimum on-time adjustment circuit 145. Hence, the output switch control signals are not turned on/off by comparison with a specific threshold value, but the error detection voltages are compared with each other, and thus, a ripple phenomenon of the output voltage VO of each unit output end may be reduced.

The minimum on-time adjustment circuit 145 adjusts an on-time of an output switch control signal SVk (k is a natural number and refers to a selected output end) of the node of the maximum error detection voltage VEk among inputs of the maximum voltage selection circuit 143 so as to be maintained for a preset minimum unit time or longer. When an error detection voltage (e.g., VE(k-1)) of the other unit output end becomes a maximum error detection voltage during the on-time, the minimum on-time adjustment circuit 145 adjusts the on-time so that the output switch control signals of the output switches SV1 to SVN do not overlap each other while moving to the next on-time section.

A minimum on-time TMIN may prevent the output switch from operating at a preset frequency or higher because switching loss of the output end may reduce power efficiency. In addition, the minimum on-time TMIN prevents overlap between on-times of the output switch control signals so that an output capacitor is not short-circuited. Operations of the output switch signals will be described later with reference to FIGS. 10A to 10C.

Figure 10A:
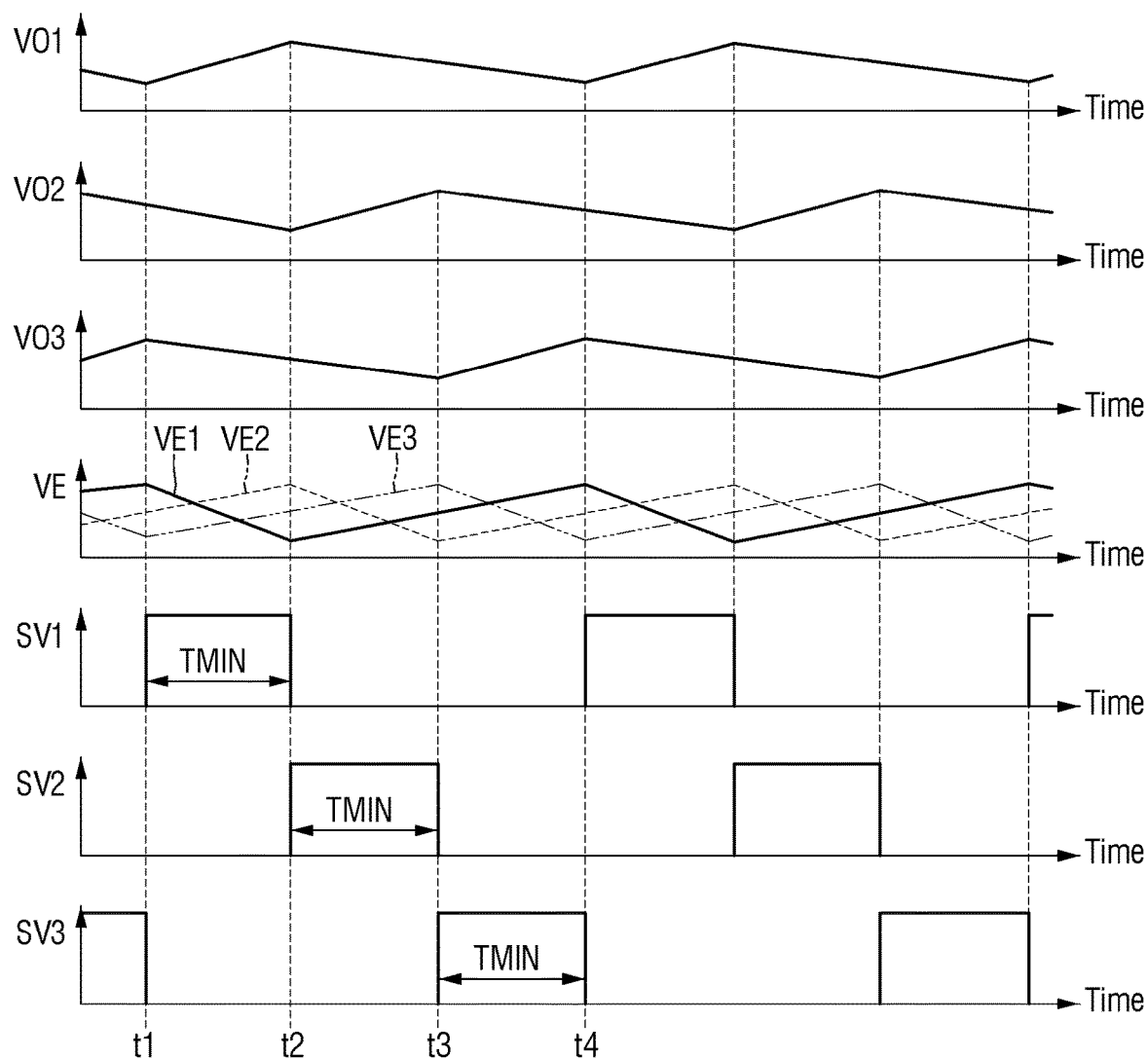
FIGS. 10A, 10B and 10C are graphs illustrating operations of output switch selection signals according to an error voltage according to some exemplary embodiments.
Figure 10B:
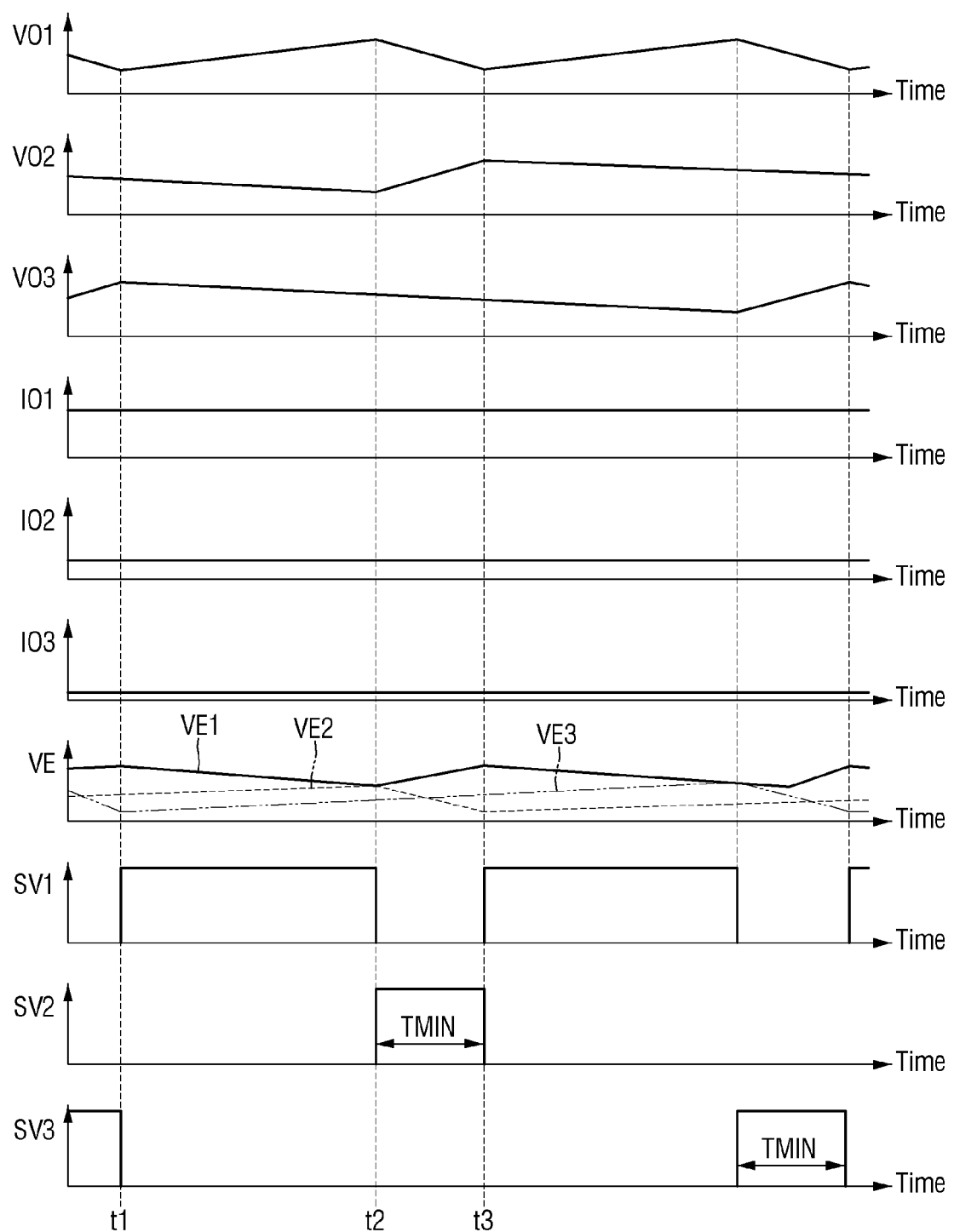
Figure 10C:
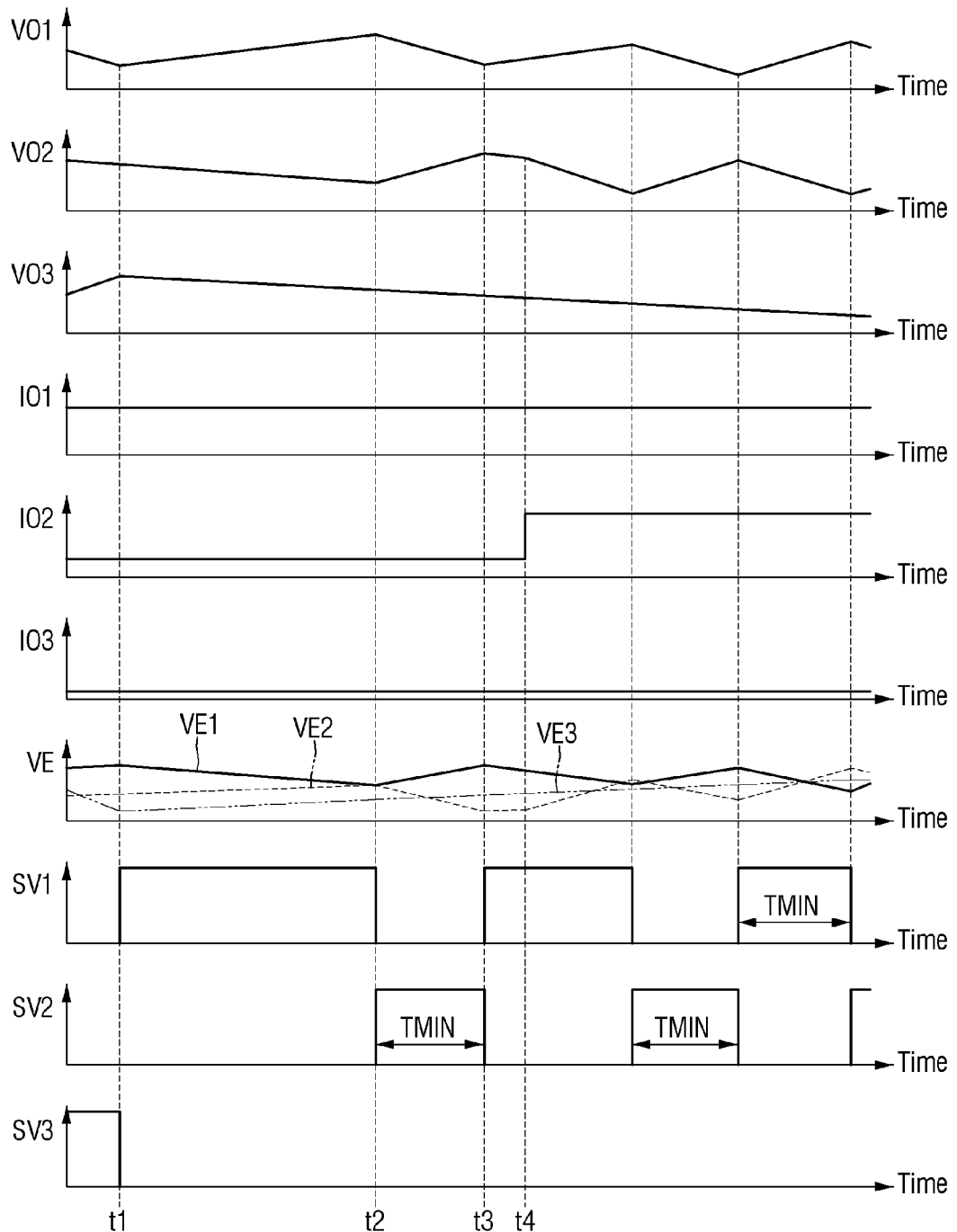

FIGS. 10A to 10C are graphs illustrating operations of output switch selection signals according to an error voltage according to some exemplary embodiments.

In FIGS. 10A to 10C, a first output voltage VO1, a first load current IO1, and an first error detection voltage VE1 are voltages and a current related to the first unit output end, a second output voltage VO2, a second load current I02, and second error detection voltage VE2 are voltages and a current related to the second unit output end, and a third output voltage VO3, a third load current 103, and a third error detection voltage VE3 are voltages and a current related to the third unit output end. The respective error detection voltages VE1, VE2, and VE3 are generated based on the output voltages VO1, VO2, and VO3 of the respective unit output ends according to the circuit of FIG. 8. The output switch control signals of the output switches SV1, SV2, and SVN turn on or off the output switches of FIG. 3.

Referring to FIG. 10A, when a position having a minimum output voltage at a point in time t1 is the first unit output end VO1 as a result of comparing the output voltages VO1, V02, and VO3 of the respective unit output ends with each other in the multi-output end circuit 120, the first error detection voltage VE1 of the error detection voltages may have a maximum value. When the first error detection voltage VE1 has the maximum value, the output switch controller 140 shifts a first output switch control signal SV1 to a logic high state and causes the logic high state to have a preset minimum on-time TMIN, and prevents the other output switch control signals of the output switches SV2 and SV3 from being turned on while the first output switch control signal of the output switch SV1 is in the logic high state.

Even though the second error detection voltage VE2 becomes higher than the first error detection voltage VE1 within the minimum on-time TMIN (t1 to t2), the output switch controller 140 maintains the first output switch control signal of the output switch SV1 in the logic high state.

When the second output voltage VO2 has a minimum output voltage at a point in time t2, the second error detection voltage VE2 has a maximum value, and the second output switch control signal of the output switch SV2 is shifted to a logic high state. At this time, when the minimum on-time of the first output switch control signal SV1 has elapsed, the first output switch control signal of the output switch SV1 is shifted to a logic low state, and only the second output switch control signal of the output switch SV2 is in a logic high state during a minimum on-time TMIN.

When the third output voltage VO3 has a minimum output voltage at a point in time t3, the third error detection voltage VE3 has a maximum value, and the third output switch control signal of the output switch SV3 is shifted to a logic high state. When the minimum on-time of the second output switch control signal SV2 has elapsed, the second output switch control signal of the output switch SV2 is shifted to a logic low state, and only the third output switch control signal of the output switch SV3 is in a logic high state during a minimum on-time TMIN or longer.

In FIG. 10B, the output switch controller 140 may operate according to a change in the error detection voltage of the unit output end. For example, when the first error detection voltage of the first unit output end is greater than the second error detection voltage of the second unit output end, the output switch controller 140 may turn on the first output switch control signal of the output switch SV1 so that an on-time of the first output switch control signal of the output switch SV1 of the first unit output end is longer than an on-time of the second output switch control signal of the output switch SV2 of the second unit output end and an on-time of or the third output switch control signal of the output switch SV3 of the third unit output end.

In FIG. 10C, unlike FIG. 10B, when a load transient phenomenon occurs in the second unit output end (102 of FIG. 3) at a point in time t1, the second error detection voltage VE2 quickly rises due to the drop of the second output voltage VO2. The output switch control signal of the output switch SV2 of the second unit output end is turned on and is shifted to a logic high state when the second error detection voltage VE2 becomes the largest compared to the other error detection voltages VE1 and VE3.

Referring to FIGS. 10A to 10C together, the output switch control signals of the output switches SV1, SV2, and SV3 may be turned on and be shifted to a logic high state during the minimum on-times according to an exemplary embodiment, but according to various exemplary embodiments, on-times of the output switch control signals of the output switches SV1, SV2, and SV3 may be quickly adjusted according to a change in the output voltage VO or the load current IO. Accordingly, the output switch control signals of the output switches SV1 to SV3 may have a fast load transient response according to the output voltage.

Figure 11A:
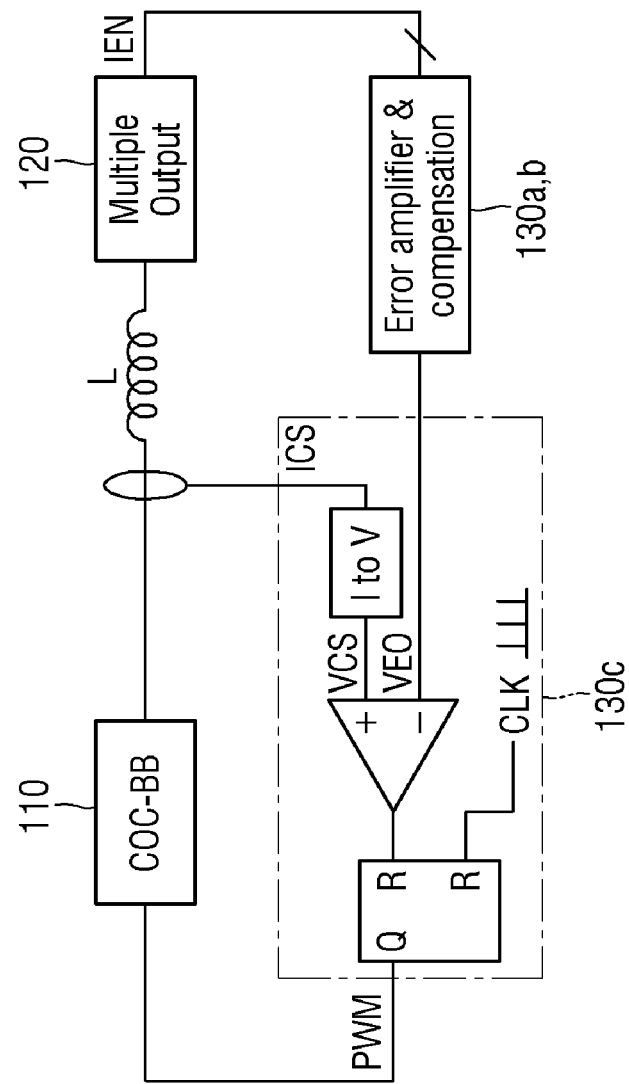
FIG. 11A is a schematic circuit diagram illustrating a modulation circuit of a switching regulator circuit according to some exemplary embodiments.
Figure 11B:
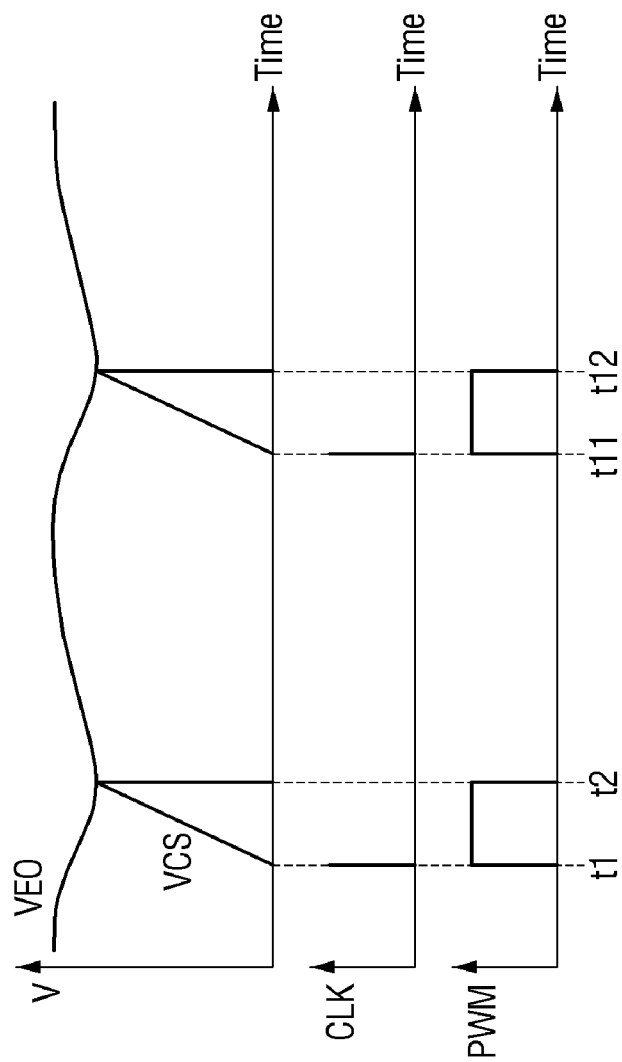
FIG. 11B is a timing diagram for describing an operation of the modulation circuit of FIG. 11A.

FIG. 11A is a schematic circuit diagram illustrating a modulation circuit of a switching regulator circuit according to some exemplary embodiments, and FIG. 11B is a timing diagram for describing an operation of the modulation circuit of FIG. 11A.

Referring to FIG. 11A, the switching regulator circuit 100 includes an input circuit 110, an inductor L, a multi-output end circuit 120, error detection and compensation circuits 130a and 130b, and a pulse width modulation circuit 130c.

The input circuit 110 may operate in the same manner as the input circuit described with reference to FIG. 3. Redundant description is omitted. However, the mode selector 160 and the input switch controller 150 of FIG. 3 may be included in the input circuit 110. In addition, the inductor L, the multi-output end circuit 120, and the error detection and compensation circuits 130a and 130b overlap those of the above-described exemplary embodiments, and a description thereof is thus omitted.

The pulse width modulation circuit 130c may include a comparator, a current-voltage converter, and a QR latch circuit. The pulse width modulation circuit 130c receives an error detection voltage VEO from the error detection and compensation circuits 130a and 130b, and compares the error detection voltage VEO with a ramp-up voltage VCS. The ramp-up voltage VCS is generated by current-voltage conversion based on a ramp-up current ICS generated by the input circuit 110 and input to the inductor L.

In the current-voltage conversion, as illustrated in FIG. 11B, the ramp-up current ICS may flow to a preset current sensing resistor to generate a gradient of the ramp-up voltage VCS. A comparison result between the ramp-up voltage VCS and the error detection voltage VEO is output from the QR latch circuit according to a clock signal CLK. A pulse width of a pulse width modulation (PWM) signal is determined according to the comparison result between the ramp-up voltage VCS and the error detection voltage VEO, and the PWM signal of which the pulse width is determined is output. Alternatively, in the current-voltage conversion, although not illustrated, according to some exemplary embodiments, in a case of a voltage mode control manner, a pulse width of a PMW signal may be determined using a ramp voltage having a triangular wave shape, and the PWM signal of which the pulse width is determined may be output.

The input circuit 110 may control the input switch controller 150 based on an output signal PWM of the pulse width modulation circuit 130c. The input switch controller 150 may be controlled based on a current mode, a voltage mode, a hysteresis mode, or the like, of the output signal PWM according to various exemplary embodiments.

In an alternative embodiment, the PWM modulator 130c is replaced with circuitry for providing a digital representation of the VEO signal. Such circuity may include a sample and hold circuit that periodically samples VEO, and an analog to digital (A/D) converter that digitizes the periodically sampled signal. The resulting digital signal may be applied to the input switch controller 150 where it is used for the same purpose as the PWM signal.

FIGS. 12A to 15E are circuit diagrams and timing diagrams for describing operating modes of the switching regulator circuit. In the circuit diagrams, paths through which currents flow are indicated by dotted lines.

Figure 12A:
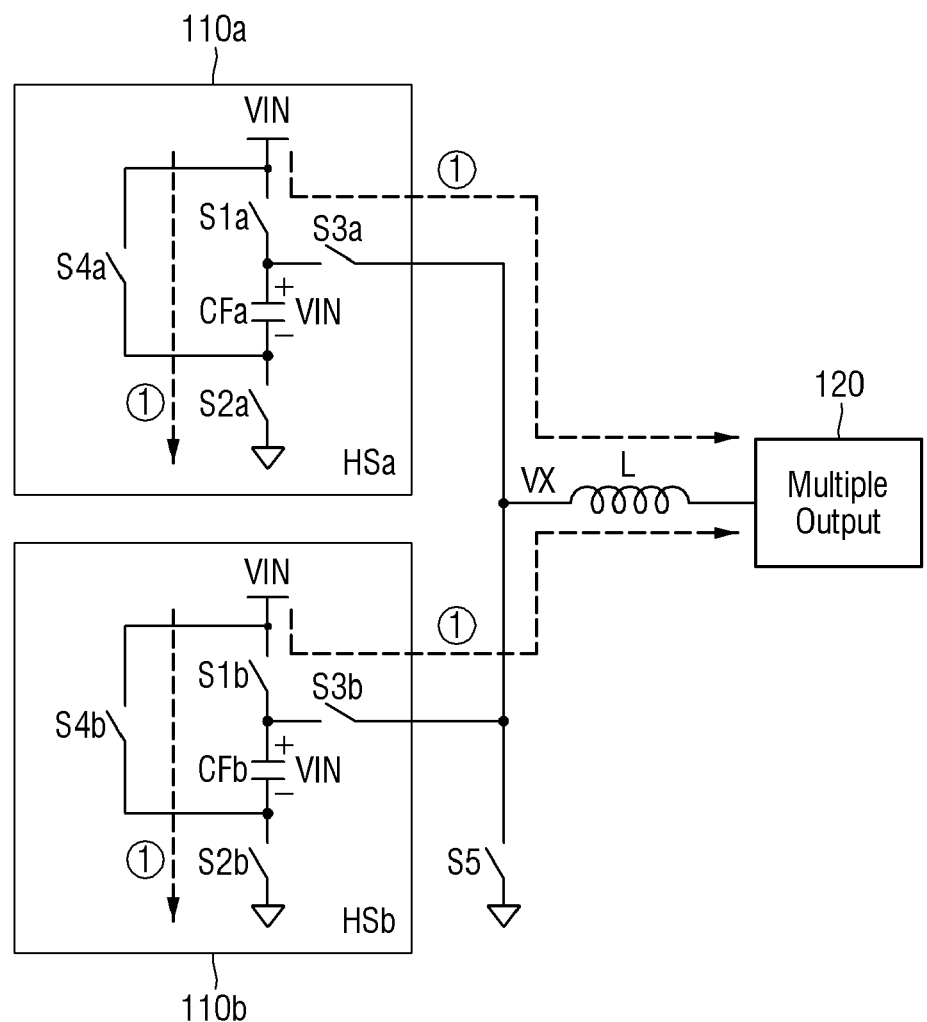
FIGS. 12A, 12B and 12C are diagrams for describing operations of an input circuit in a buck mode.
Figure 12B:
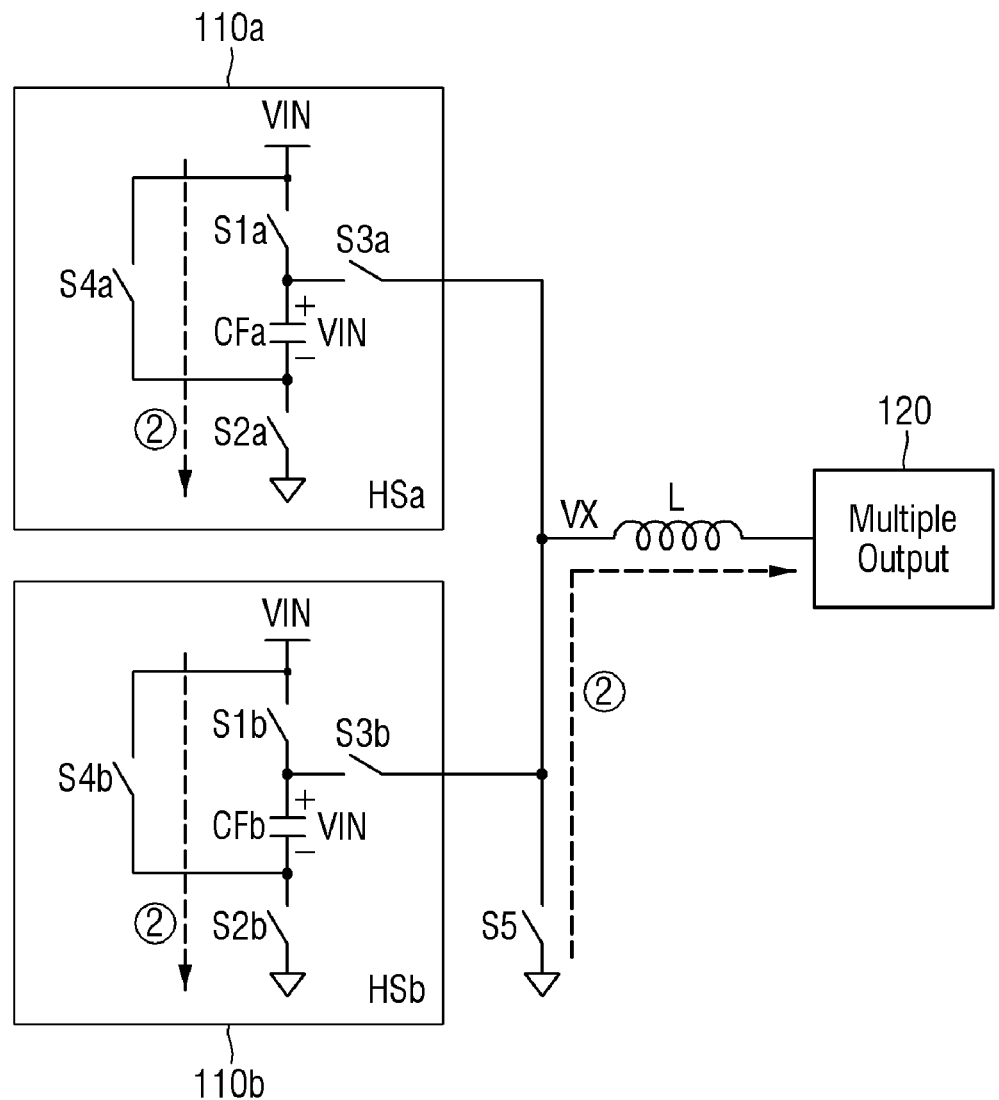
Figure 12C:
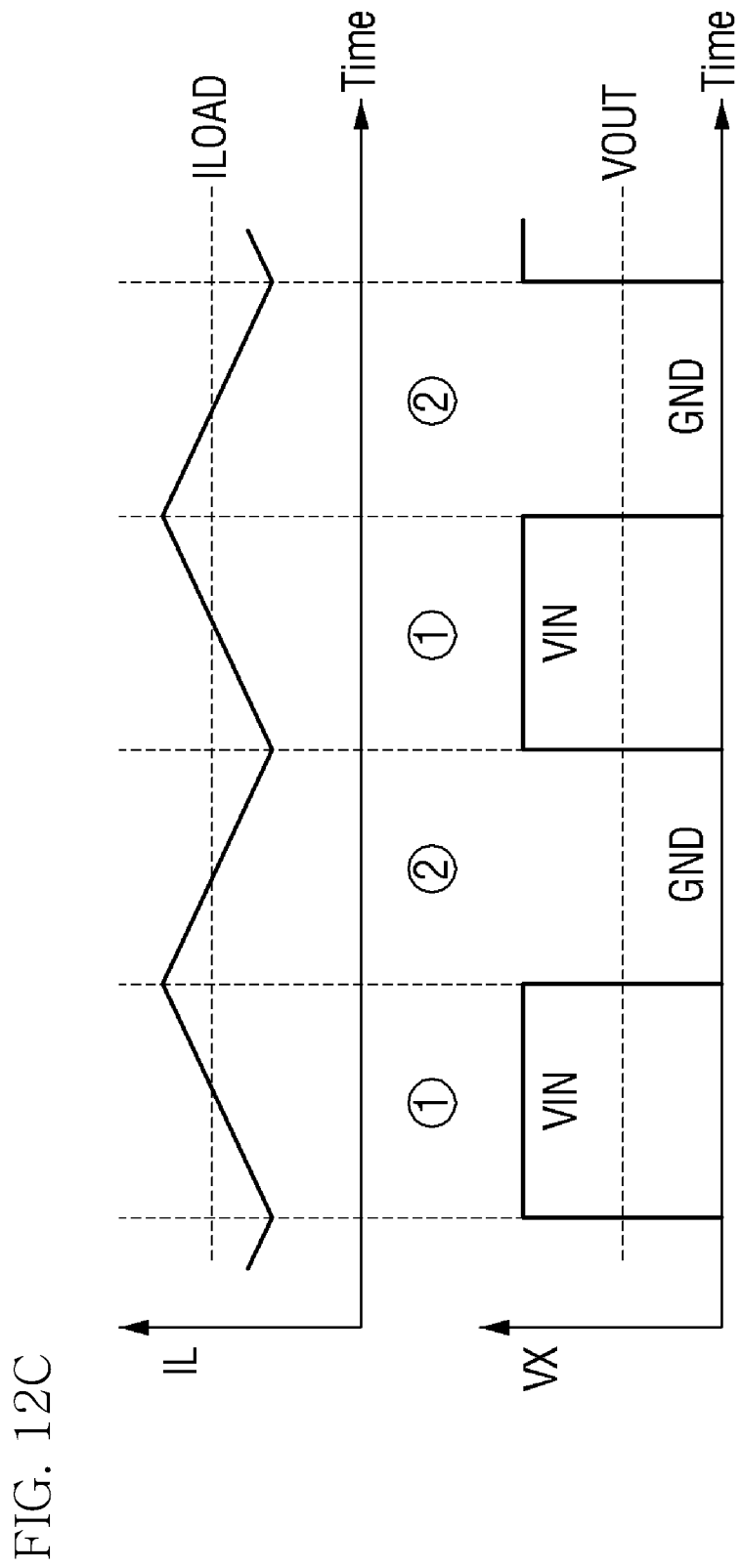

FIGS. 12A to 12C are diagrams for describing operations of an input circuit in a buck mode. FIGS. 12A and 12B illustrate operations of the input circuit in a first phase (Phase 1) and a second phase (Phase 2) in the buck mode, respectively. FIG. 12C depicts example waveforms of a voltage and a current for describing an operation of the input circuit in the buck mode. In the buck mode, the first circuit part 110a and the second circuit part 110b operate in a synchronous switching control manner to reduce conduction losses of the input switches S1a and S1b and the input switches S3a and S3b. The synchronous switching control manner may refer to a manner of controlling the switches so that the first flying capacitor CFa and the second flying capacitor CFb are charged in the same phase or are connected to the inductor L in the same phase over a plurality of phases of a switching cycle.

In FIGS. 12A and 12C, in the first phase, in the first circuit part 110a, the input switches S1a, S2a, and S3a are turned on (closed), and the input switches S4a and S5 are turned off. Also, in the second circuit part 110b, the input switches S1b, S2b, and S3b are turned on, and the input switch S4b is turned off. Currents for charging the flying capacitors CFa and CFb and a current applied to the inductor L may simultaneously flow to the first circuit part 110a and the second circuit part 110b. Accordingly, an inductor current IL may gradually rise, and an applied voltage VX may coincide with the input voltage VIN.

In FIG. 12B, in the second phase, in the first circuit part 110a, the input switches S1a, S2a, and S5 are turned on, and the input switches S3a and S4a are turned off. Also, in the second circuit part 110b, the input switches S1b and S2b are turned on, and the input switches S3b and S4b are turned off. Accordingly, the input voltage VIN does not pass through the flying capacitors CFa and CFb, and the inductor L may be connected to a ground node based on the input switch S5 to receive an applied voltage VX corresponding to a ground voltage GND. Accordingly, the inductor current IL may gradually fall, such that the applied voltage VX becomes equal to the ground voltage GND. In this case, each of the flying capacitors CFa and CFb may be charged according to the input voltage VIN.

Figure 13A:
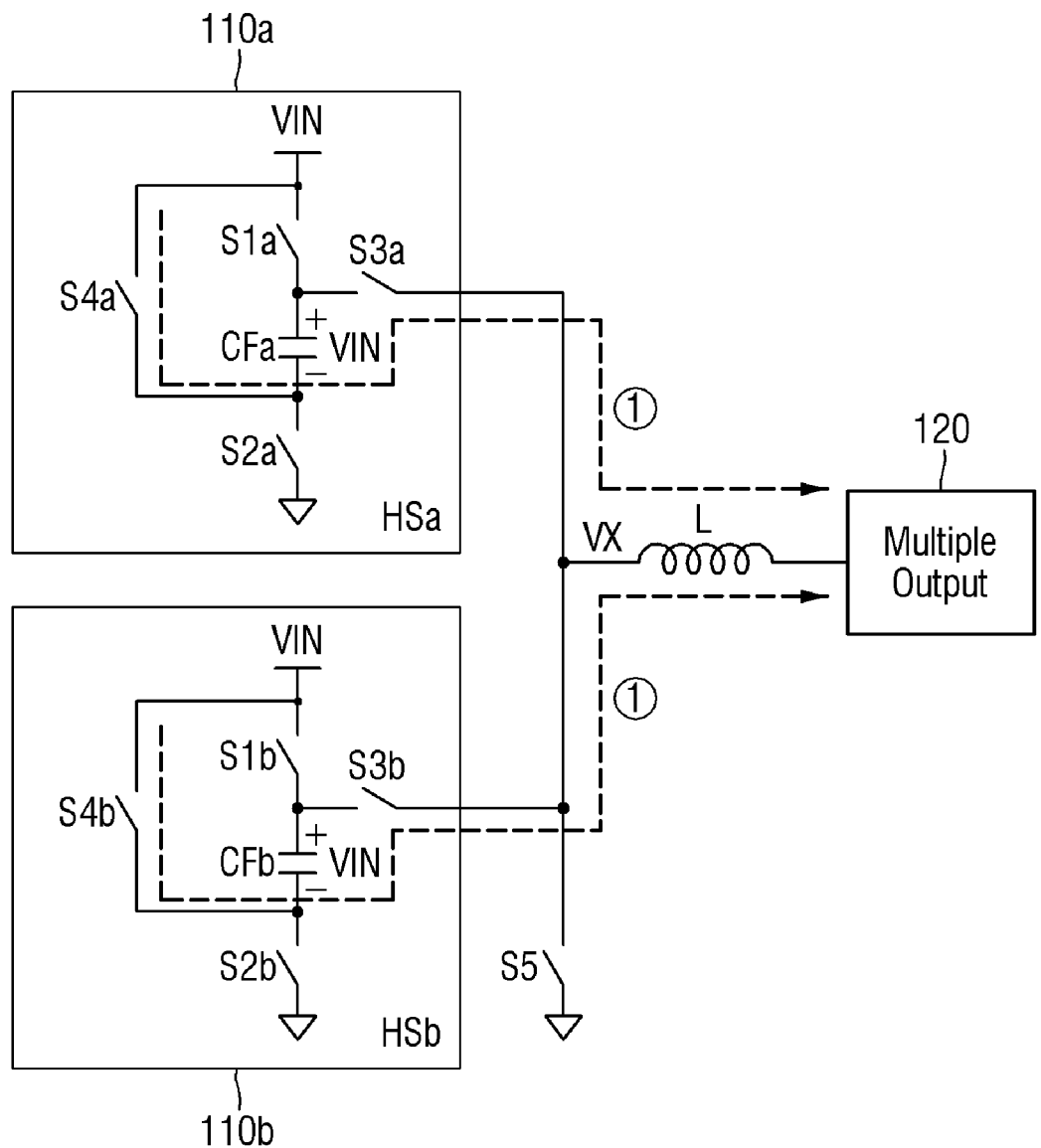
FIGS. 13A, 13B to 13D are diagrams for describing operations of the input circuit in a buck-boost mode.
Figure 13B:
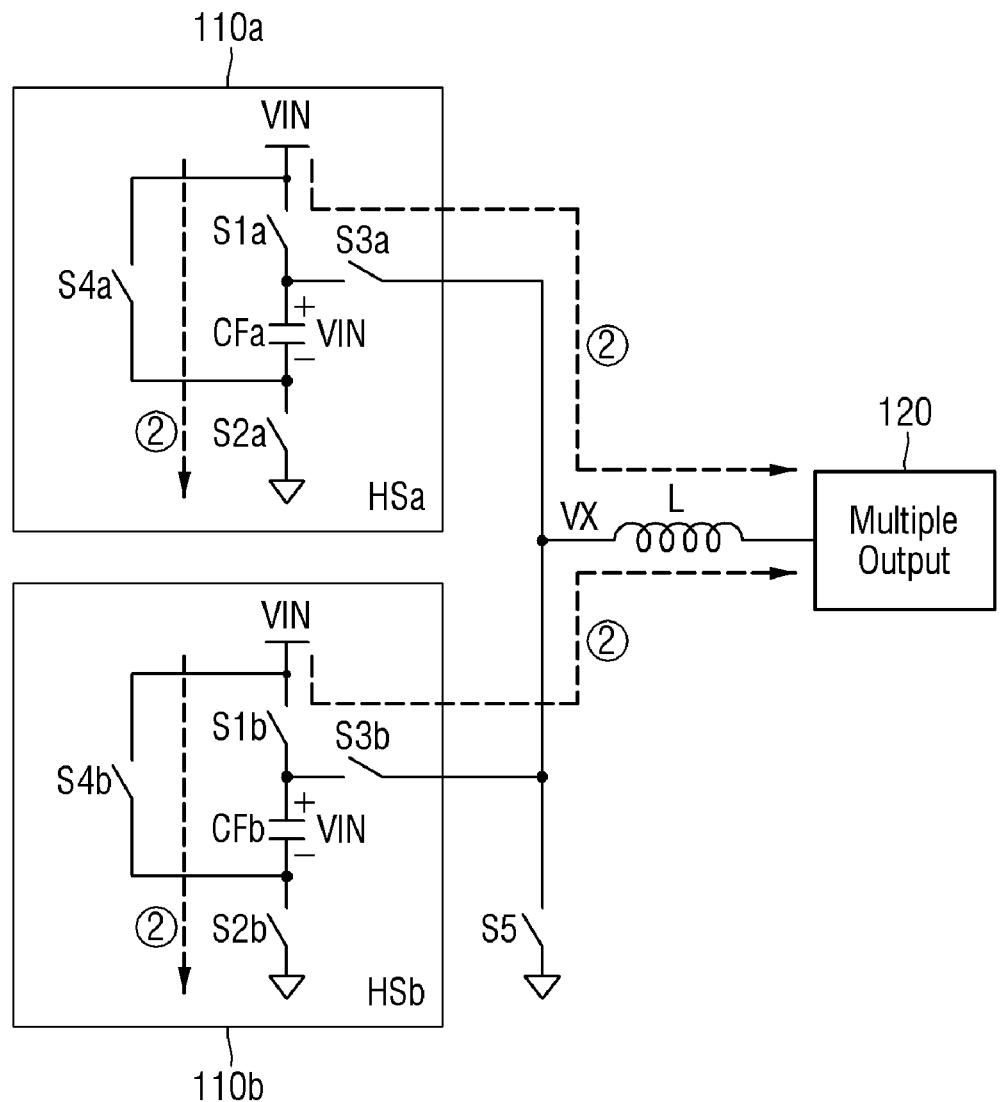
Figure 13C:
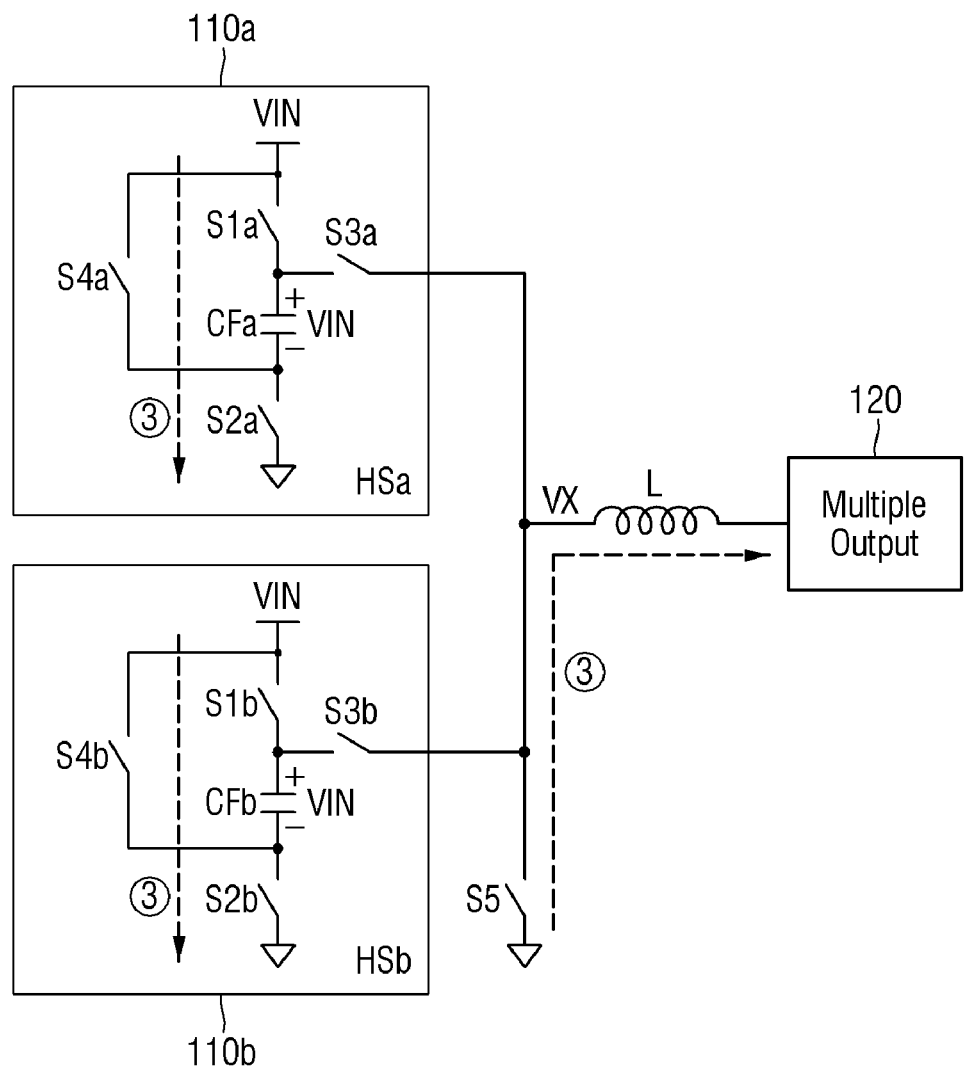
Figure 13D:
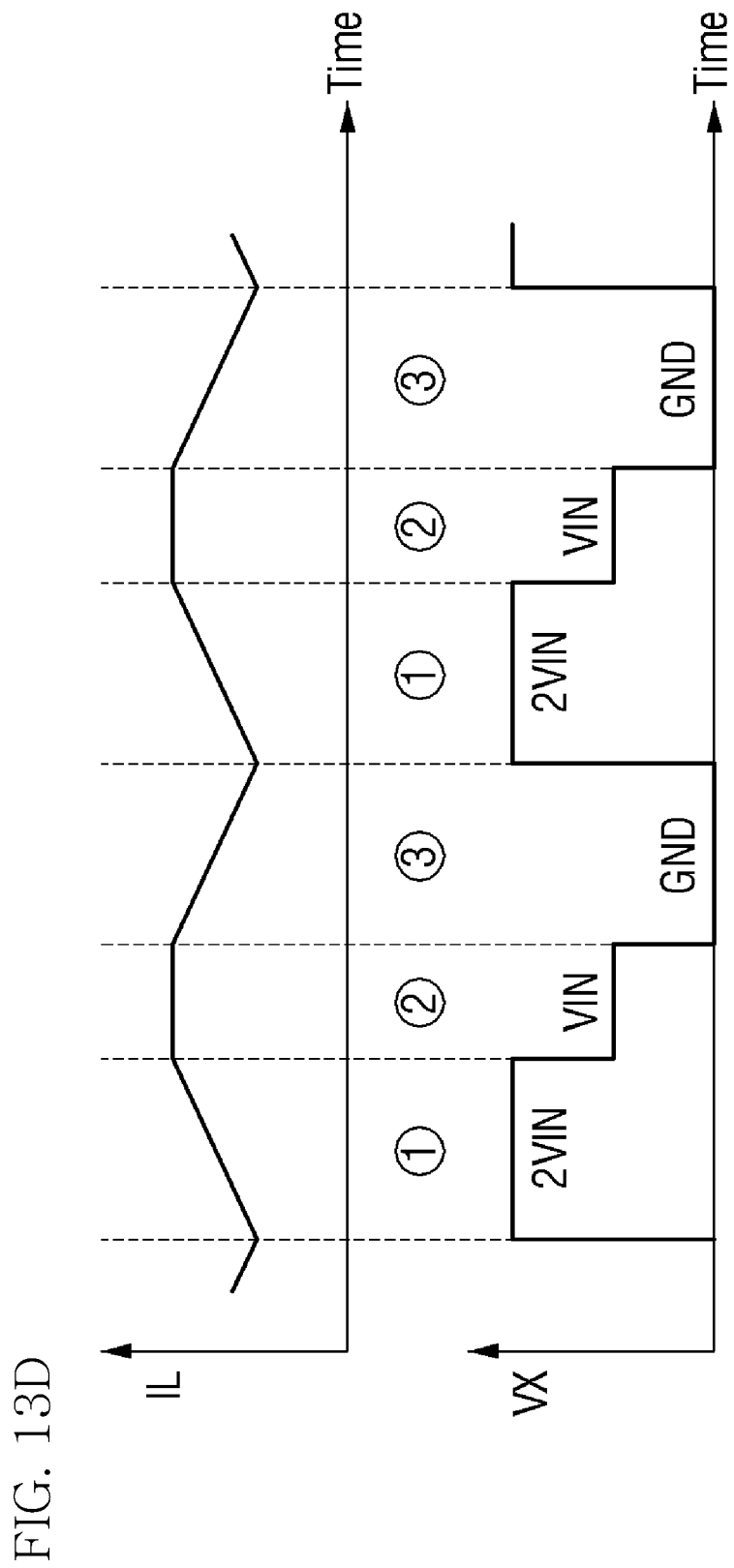

FIGS. 13A to 13D are diagrams for describing exemplary operations of the input circuit in a buck-boost mode. In the buck-boost mode, the input circuit operates in three phases, and the first circuit part 110a and the second circuit part 110b operate in a synchronous switching control manner. FIG. 13A illustrates current paths of the input circuit 110 in a first phase (Phase 1), FIG. 13B illustrates current paths of the input circuit 110 in a second phase (Phase 2), FIG. 13C illustrates current paths of the input circuit 110 in the third phase (Phase 3), and FIG. 13D shows graphs of a voltage and a current for describing an operation of the input circuit in the buck-boost mode. In FIGS. 13A to 13C, current paths are indicated by dotted lines.

Referring to FIGS. 13A and 13D, according to some exemplary embodiments, in the first phase, in the first circuit part 110a, the input switches S3a and S4a are turned on, and the input switches S1a, S2a, and S5 are turned off. Similar to the first circuit part 110a, in the second circuit part 110b, the input switches S3b and S4b are turned on, and the input switches S1b and S2b are turned off. Each of the flying capacitors CFa and CFb is connected between the inductor L and the power supply end to which the input voltage VIN is applied. The flying capacitors CFa and CFb are charged based on the input voltage VIN, and unlike the buck mode of FIG. 12, currents flow only along paths passing through the flying capacitors. Accordingly, an inductor current IL applied to the inductor L may gradually rise, but an applied voltage VX may reach a voltage corresponding to about two times the input voltage VIN in proportion to the number of flying capacitors.

Referring to FIGS. 13B and 13D, according to some exemplary embodiments, in the second phase, in the first circuit part 110a, the input switches S1a, S2a, and S3a are turned on, and the input switches S4a and S5 are turned off. Similar to the first circuit part 110a, in the second circuit part 110b, the input switches S1b, S2b, and S3b are turned on, and the input switch S4b is turned off. Each of the flying capacitors CFa and CFb is connected between the power supply VIN and ground, such that currents for charging the flying capacitors CFa and CFb and a current applied to the inductor L may simultaneously flow to the first and second circuit parts 110a and 110b. Accordingly, an inductor current IL may gradually rise, and an applied voltage VX may coincide with the input voltage VIN.

In FIGS. 13C and 13D, in the third phase, in the first circuit part 110a, the input switches S1a, S2a, and S5 are turned on, and the input switches S3a and S4a are turned off. Also, in the second circuit part 110b, the input switches S1b and S2b are turned on, and the input switches S3b and S4b are turned off. Accordingly, the input voltage VIN does not pass through the flying capacitors CFa and CFb, and the inductor L may be connected to a ground node based on the input switch S5 to receive an applied voltage VX corresponding to a ground voltage GND. Accordingly, the inductor current IL may gradually fall, such that the applied voltage VX becomes equal to the ground voltage GND. In this case, each of the flying capacitors CFa and CFb may be charged according to the input voltage VIN.

That is, in the buck-boost mode, the applied current IL applied to the inductor L gradually rises (①), is maintained for a predetermined time (②), and then gradually falls (③) according to three phases. Based on the applied current, the applied voltage VX is also shifted to a voltage 2VIN corresponding to about two times the input voltage, a voltage VIN corresponding to the input voltage, and a ground voltage GND.

Figure 14A:
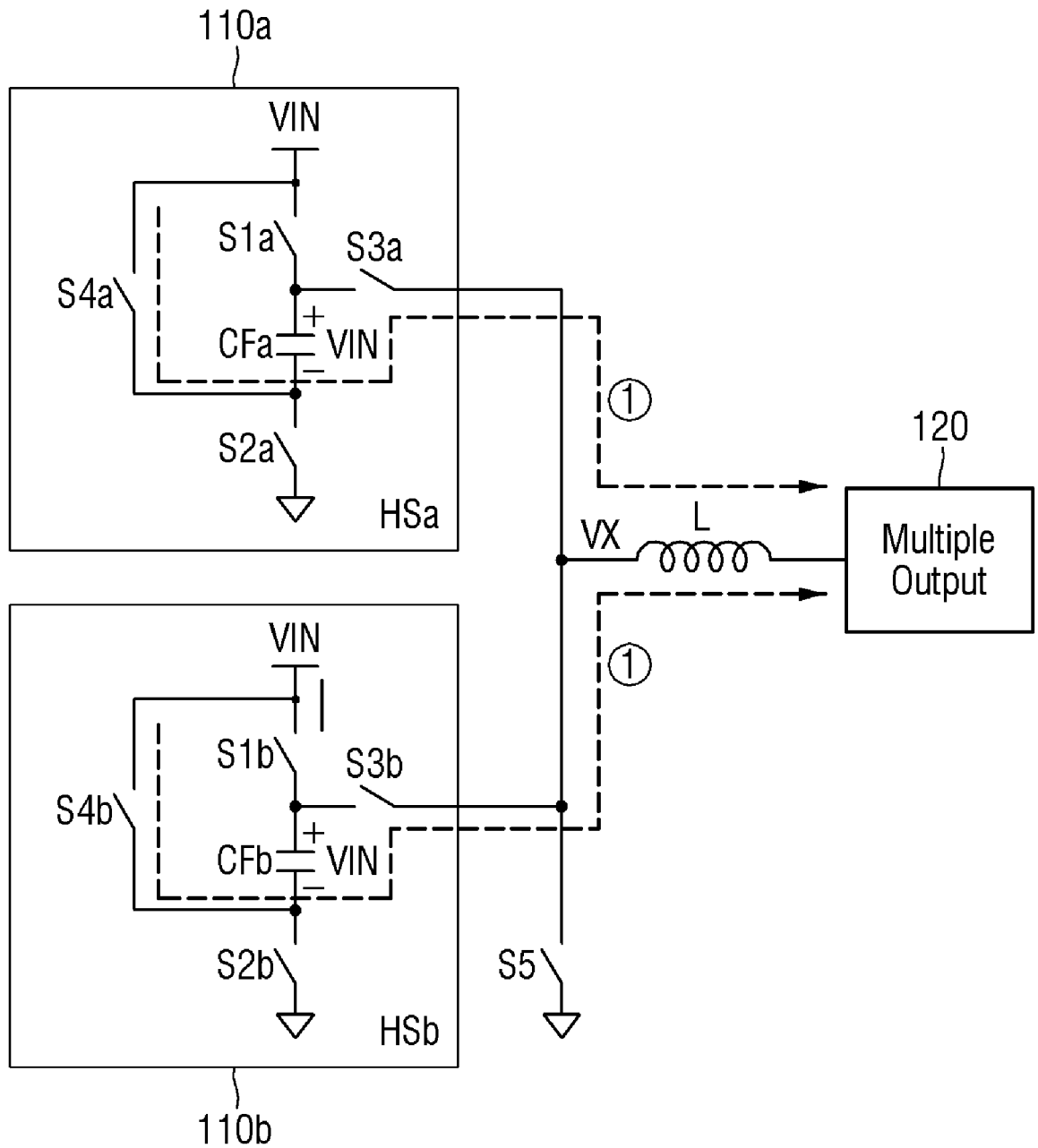
FIGS. 14A, 14B and 14C are diagrams for describing operations of the input circuit in a synchronous boost mode.
Figure 14B:
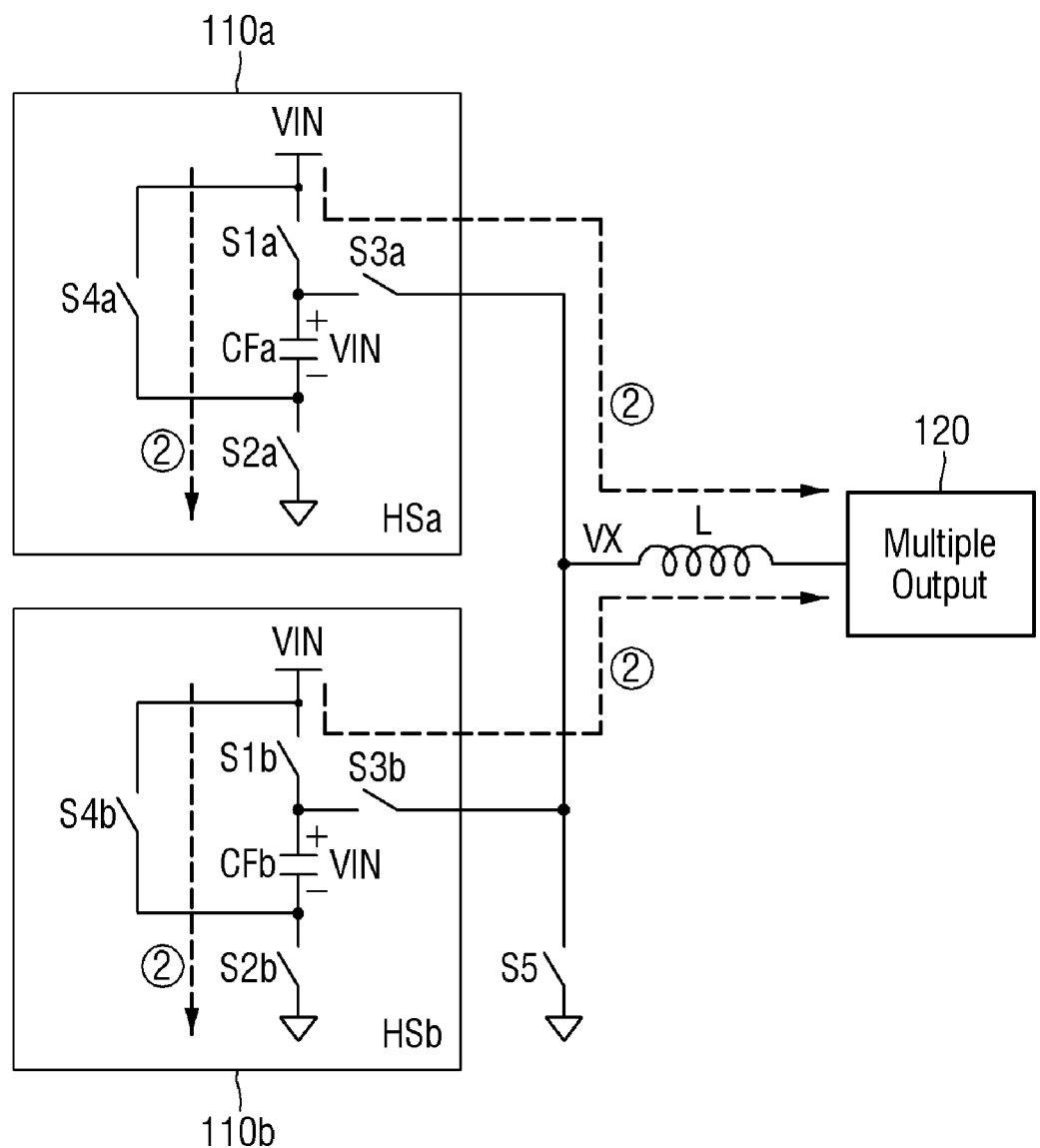
Figure 14C:
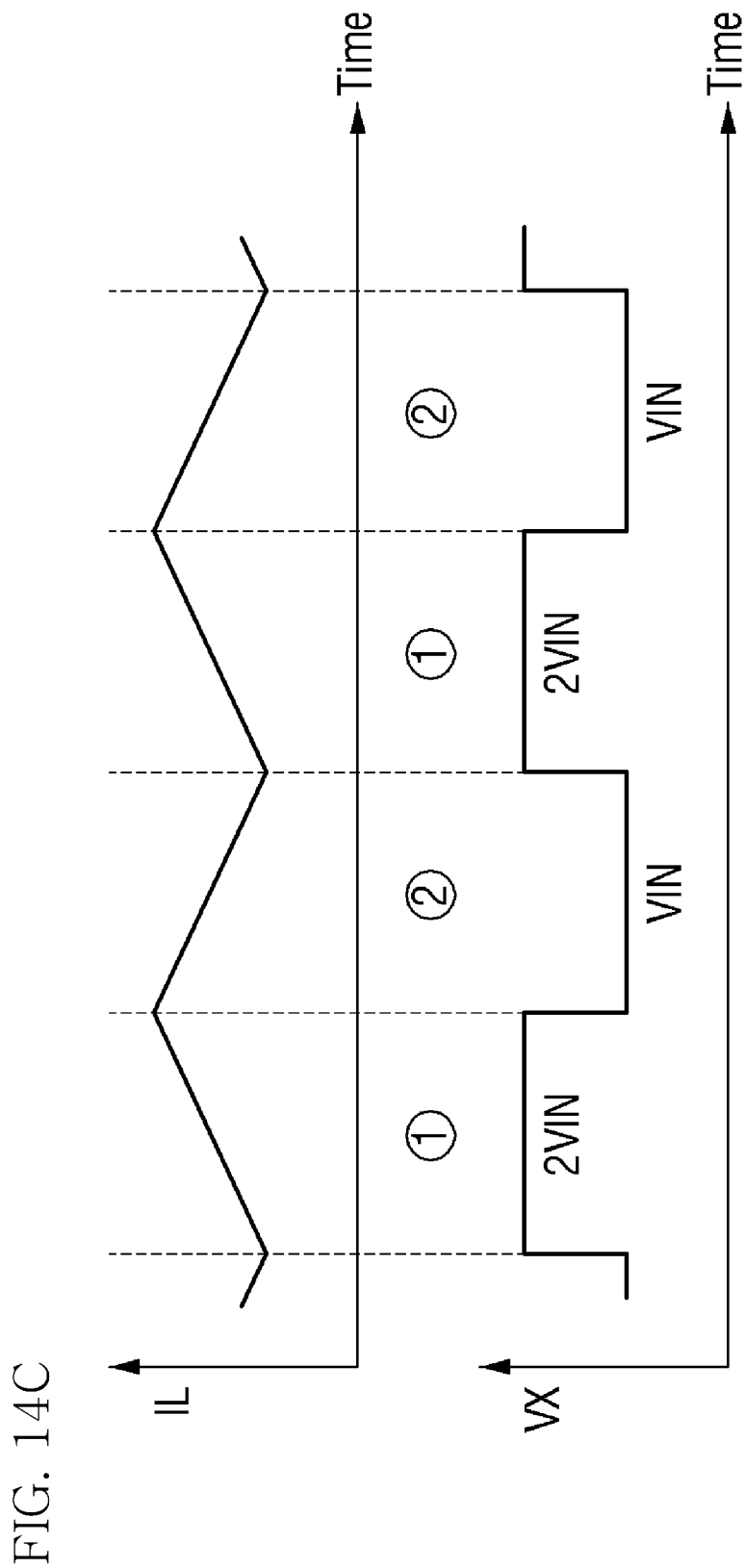

FIGS. 14A to 14C are diagrams for describing operations of the input circuit in a synchronous boost mode. FIG. 14A illustrates current paths of the input circuit 110 in a first phase (Phase 1), FIG. 14B illustrates current paths of the input circuit 110 in a second phase (Phase 2), and FIG. 14C shows graphs of a voltage and a current for describing an operation of the input circuit in the synchronous boost mode. Current paths are indicated by dotted lines.

Referring to FIGS. 14A and 14C, according to some exemplary embodiments, in the first phase, in the first circuit part 110a, the input switches S3a and S4a are turned on, and the input switches S1a, S2a, and S5 are turned off. Similar to the first circuit part 110a, in the second circuit part 110b, the input switches S3b and S4b are turned on, and the input switches S1b and S2b are turned off. Each of the flying capacitors CFa and CFb is connected between the inductor L and the power supply end to which the input voltage VIN is applied. Accordingly, an inductor current IL applied to the inductor L may gradually rise, but an applied voltage VX may reach a voltage corresponding to about two times the input voltage VIN in proportion to the number of flying capacitors.

Referring to FIGS. 14B and 14C, according to some exemplary embodiments, in the second phase, in the first circuit part 110a, the input switches S1a, S2a, and S3a are turned on, and the input switches S4a and S5 are turned off. Similar to the first circuit part 110a, in the second circuit part 110b, the input switches S1b, S2b, and S3b are turned on, and the input switch S4b is turned off. One end of each flying capacitor is connected to the power supply end and the inductor and the other end of each flying capacitor is connected to both ends of a ground end, such that currents for charging the flying capacitors CFa and CFb and a current applied to the inductor L may simultaneously flow to the first circuit part 110a and the second circuit part 110b. Accordingly, an inductor current IL may gradually rise, and an applied voltage VX may coincide with the input voltage VIN.

That is, in the synchronous boost mode, the applied current IL applied to the inductor L gradually rises (①), and then gradually falls (②) according to two phases. The applied voltage VX is also about two times the voltage (2VIN) of the input voltage in section ①, and is then shifted to a voltage VIN corresponding to one time the input voltage in section ②.

Figure 15A:
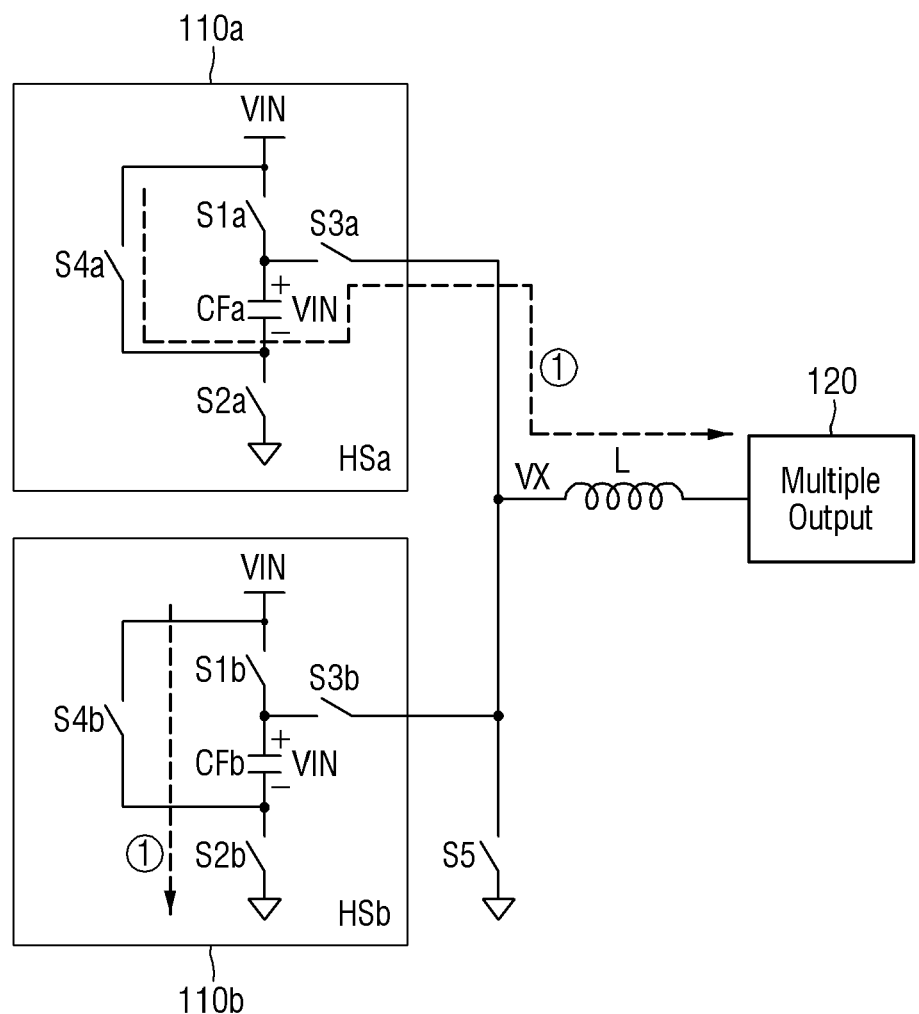
FIGS. 15A, 15B, 15C, 15D and 15E are diagrams for describing operations of the input circuit in an interleaving boost mode.
Figure 15B:
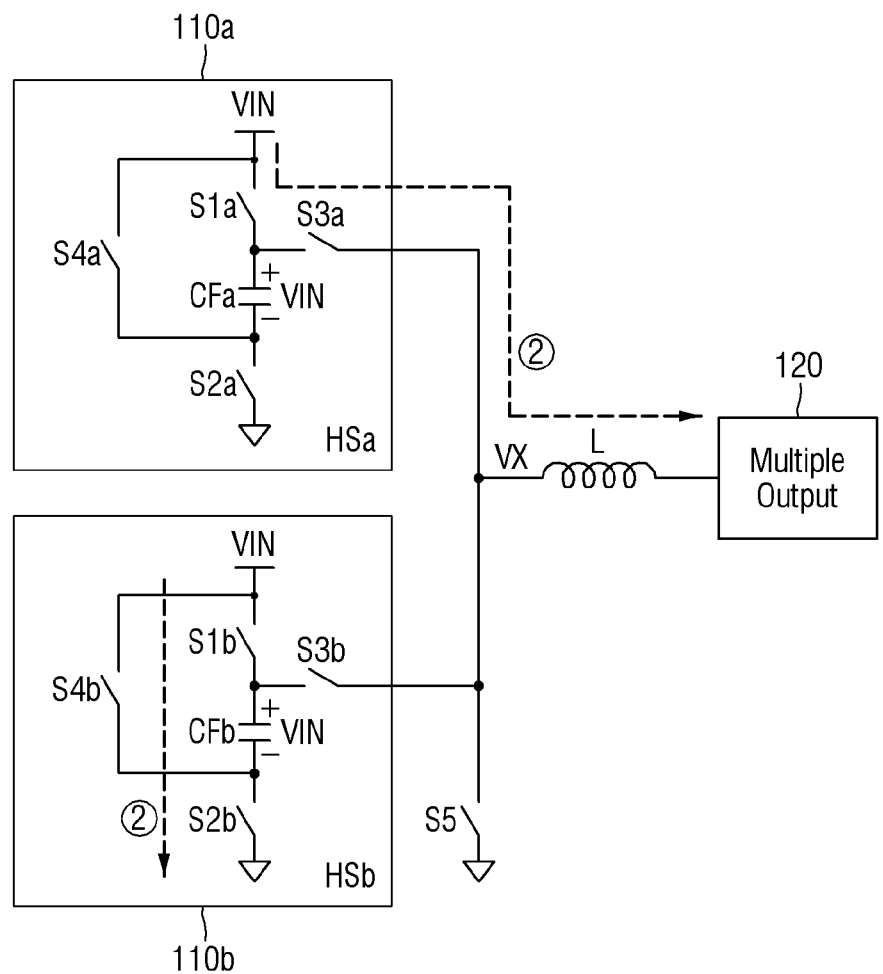
Figure 15C:
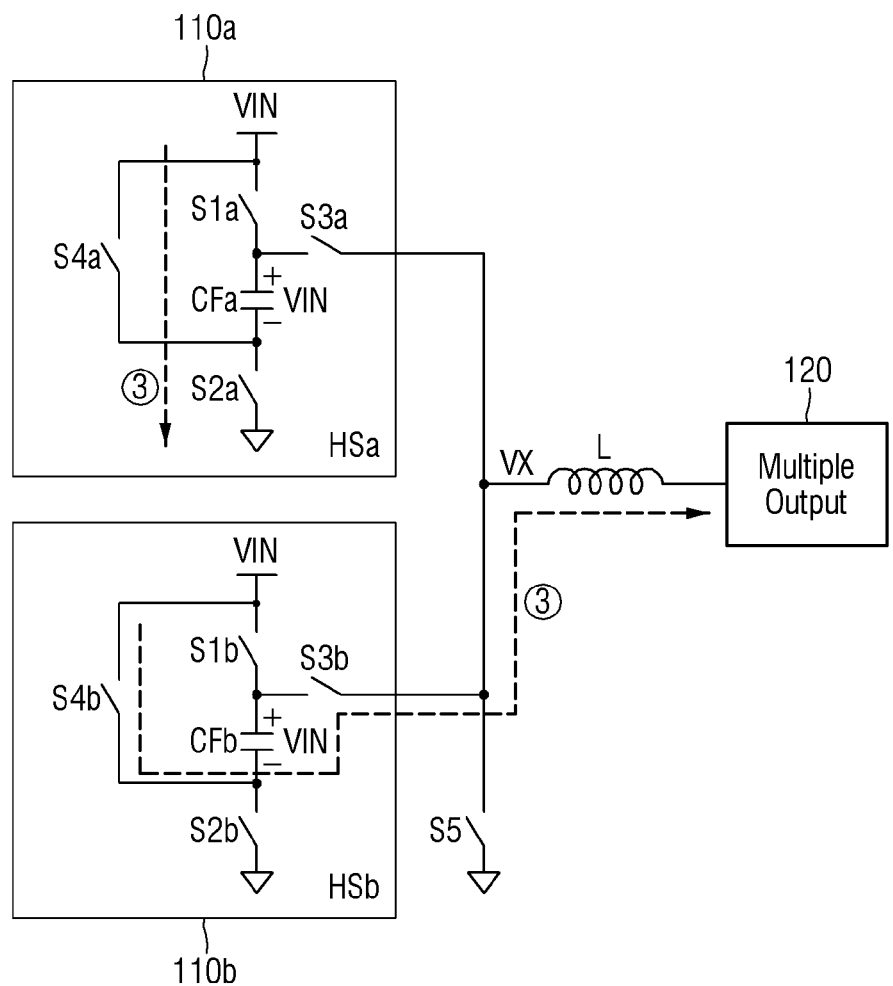
Figure 15D:
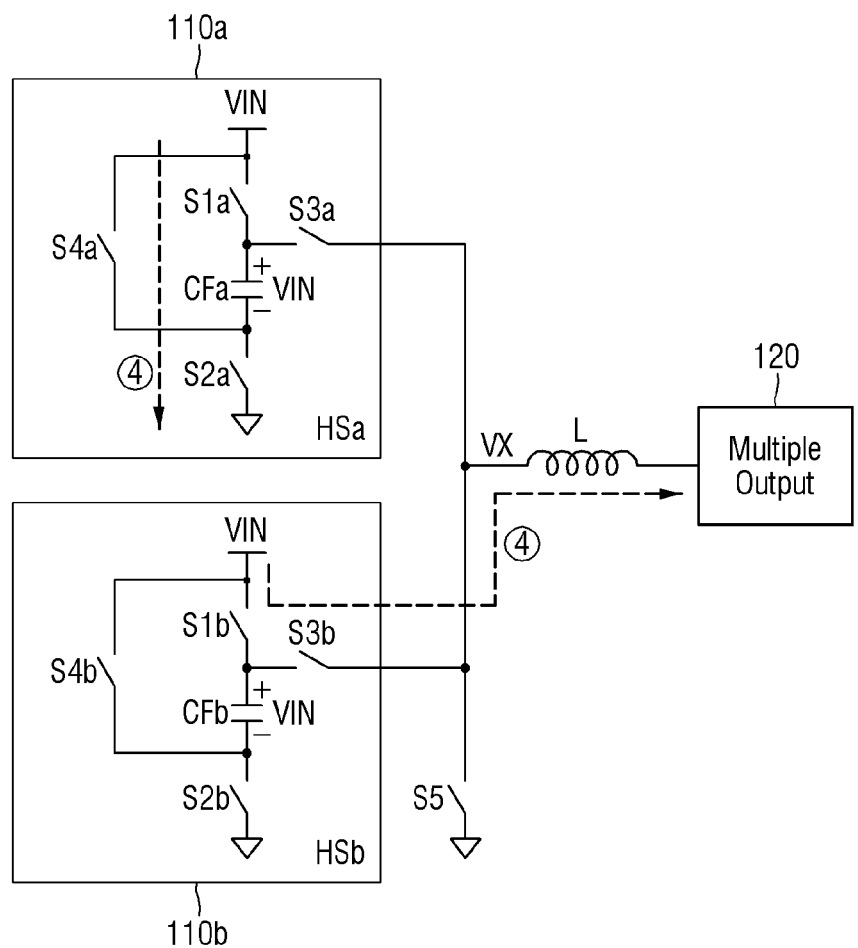
Figure 15E:
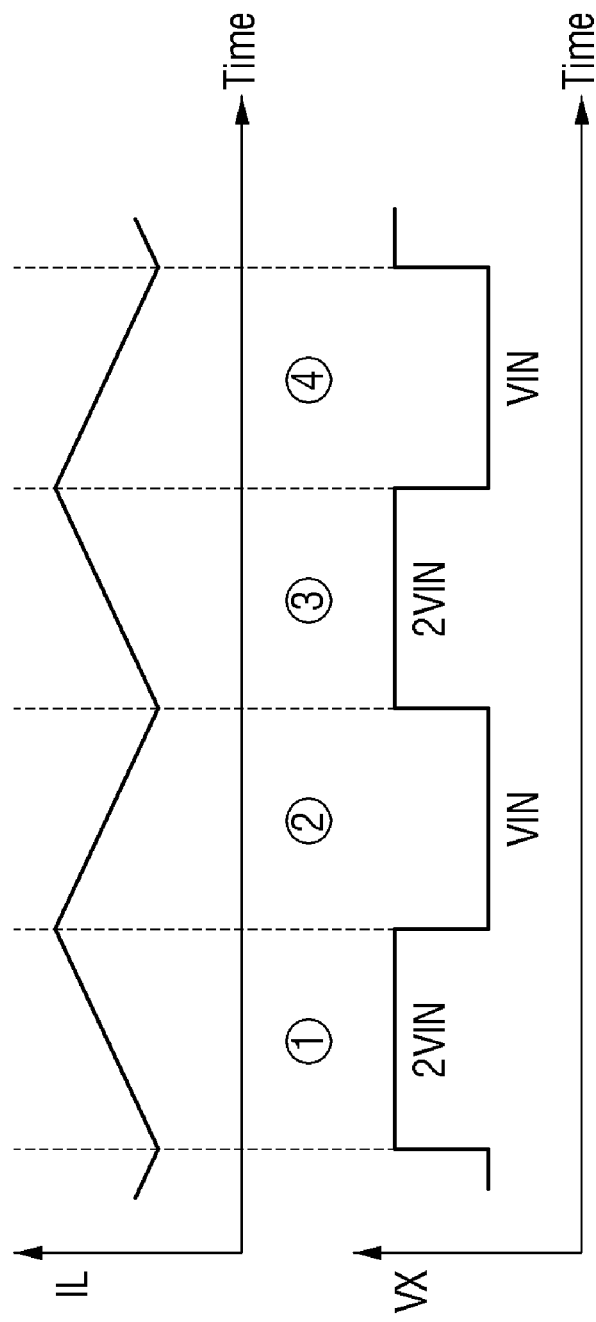

FIGS. 15A to 15E are diagrams for describing operations of the input circuit in an interleaving boost mode. FIGS. 15A to 15D illustrate current paths of the input circuit 110 in a first phase (Phase 1) to a fourth phase (Phase 4), and FIG. 15E shows graphs of a voltage and a current for describing an operation of the input circuit.

Referring to FIGS. 15A, 15B, and 15E, in the first phase, in the first circuit part 110a, the input switches S3a and S4a are turned on, and the input switches S1a, S2a, and S5 are turned off. In the second circuit part 110b, the input switches S1b and S2b are turned on, and the input switches S3b and S4b are turned off. Meanwhile, in the second phase, in the first circuit part 110a, the input switches S1a and S3a are turned on, and the input switches S2a, S4a, and S5 are turned off. In the second circuit part 110b, the input switches S1b and S2b are turned on, and the input switches S3b and S4b are turned off. While the second circuit part 110b continuously charges intensively the flying capacitor CFb with electric charges in the first phase and the second phase, the first circuit part 110a provides a voltage boosted in the flying capacitor CFa or the input voltage to the inductor L as an applied voltage.

In addition, referring to FIGS. 15C, 15D, and 15E, in the third phase, in the first circuit part 110a, the input switches S1a and S2a are turned on, and the input switches S3a and S4a are turned off. In the second circuit part 110b, the input switches S3b and S4b are turned on, and the input switches S1b, S2b, and S5 are turned off. Meanwhile, in the fourth phase, in the first circuit part 110a, the input switches S1a and S2a are turned on, and the input switches S3a and S4a are turned off. In the second circuit part 110b, the input switches S1b and S3b are turned on, and the input switches S2b and S4b are turned off. Thus, in the third and fourth phases, the first circuit part 110a continuously charges intensively the flying capacitor CFb with electric charges, and the second circuit part 110b provides the input voltage VIN as an applied voltage VX or provides a voltage charged in the flying capacitor CFb as an applied voltage VX.

That is, in the interleaving boost mode, the first circuit part 110a and the second circuit part 110b alternately operate to reduce an average applied current IL input to the inductor L under a high duty condition. For example, while the first circuit part 110a charges the flying capacitor CFa, the second circuit part 110b provides power to the inductor, and conversely, while the second circuit part 110b charges the flying capacitor CFb, the first circuit part 110a provides power to the inductor. According to such an interleaving boost operation, an average current $I_{S1}$ provided to the input switch S1 is expressed by the following Equation (7).

$$I_{S1\_INT\_AVG} = \frac{\Delta Q_{FLY}}{\frac{1}{F_{SW}}} = I_O D \qquad (7)$$

In Equation (7), $I_{S1\_INT\_AVG}$ refers to an average initial current applied to the switch S1, $Q_{FLY}$ refers to a quantity of electric charges charged in the flying capacitors CFa and CFb), $F_{SW}$ refers to an operating frequency of the switch, $I_O$ refers to an output current, and D refers to a length of a duty in a switching cycle. Referring to Equation (7), an average current in the switch S1 is stably applied, and the input circuit stably operates with high efficiency even in a state in which the duty D is high.

Thus, an operation of a booster converter may be reconfigured according to a duty ratio, and the above-described switching regulator circuit 100 may stably operate with high efficiency.

Figure 16:
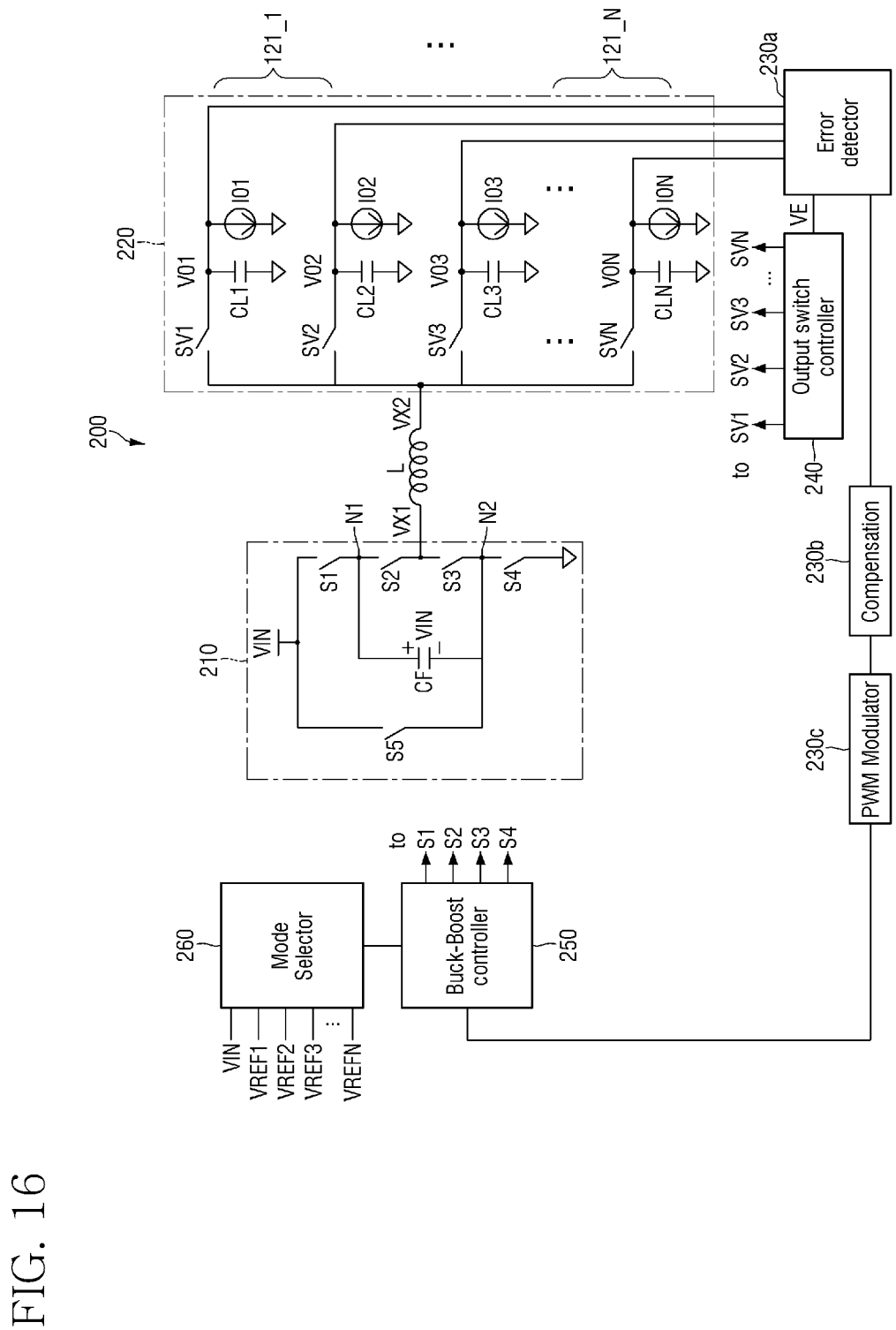
FIG. 16 is a circuit diagram illustrating a switching regulator circuit according to some exemplary embodiments.

FIG. 16 is a circuit diagram illustrating a switching regulator circuit according to some exemplary embodiments.

Referring to FIG. 16, a switching regulator circuit 200 may include an input circuit 210, an inductor L, a multi-output end circuit 220, an error detection circuit 230a, a compensation circuit 230b, a pulse width modulation circuit 230c, an output switch controller 240, an input switch controller 250, and a mode selector 260. The switching regulator circuit 200 includes the inductor L, the multi-output end circuit 220, the error detection circuit 230a, the compensation circuit 230b, the pulse width modulation circuit 230c, the output switch controller 240, the input switch controller 250, and the mode selector 260 that are the same as those of the switching regulator circuit 100 described above with reference to FIG. 3, and a redundant description thereof is thus omitted.

The input circuit 210 may include one flying capacitor CF and a plurality of input switches S1 to S5. Switches S1 to S4 are connected to each other in series between a power input terminal, to which a battery input voltage VIN is provided, and a ground conductor (e.g., a power ground) at a ground voltage GND. The flying capacitor CF is connected between a first common node between the switch S1 and the switch S2 and a second common node between the switch S3 and the switch S4. The switch S5 is connected between the power input end and the second common node. The input circuit 210 illustrated in FIG. 16 may be implemented with fewer switches and capacitors than the input circuit 110 of FIG. 3.

The input circuit 210 may operate in a first phase to a fourth phase, and may operate according to a plurality of operating modes each including at least two of the first phase to the fourth phase. The plurality of operating modes may be determined based on at least one of an output voltage VO, an error detection voltage VE, or an error detection current IE. For example, each operating mode may be selected according to the reference described in FIG. 5 or FIG. 7 to generate an applied voltage VX1 of the inductor L.

For example, the input circuit 210 may turn on the input switches S1, S2, and S4 and turn off the input switches S3 and S5 in the first phase to provide a boosting voltage of the flying capacitor CF as the applied voltage VX1. For example, the input circuit 210 may turn on the input switches S1 and S4 and turn off the input switches S2, S3, and S5 in the second phase to charge the flying capacitor CF with electric charges. For example, the input circuit 210 may turn on the input switches S1 and S2 and turn off the input switches S3, S4, and S5 in the third phase to provide the input voltage VIN as the applied voltage VX1. For example, the input circuit 210 may turn on the input switches S3 and S4 and turn off the input switches S1, S2, and S5 in the fourth phase to provide a ground voltage GND as the applied voltage VX1.

Figure 17:
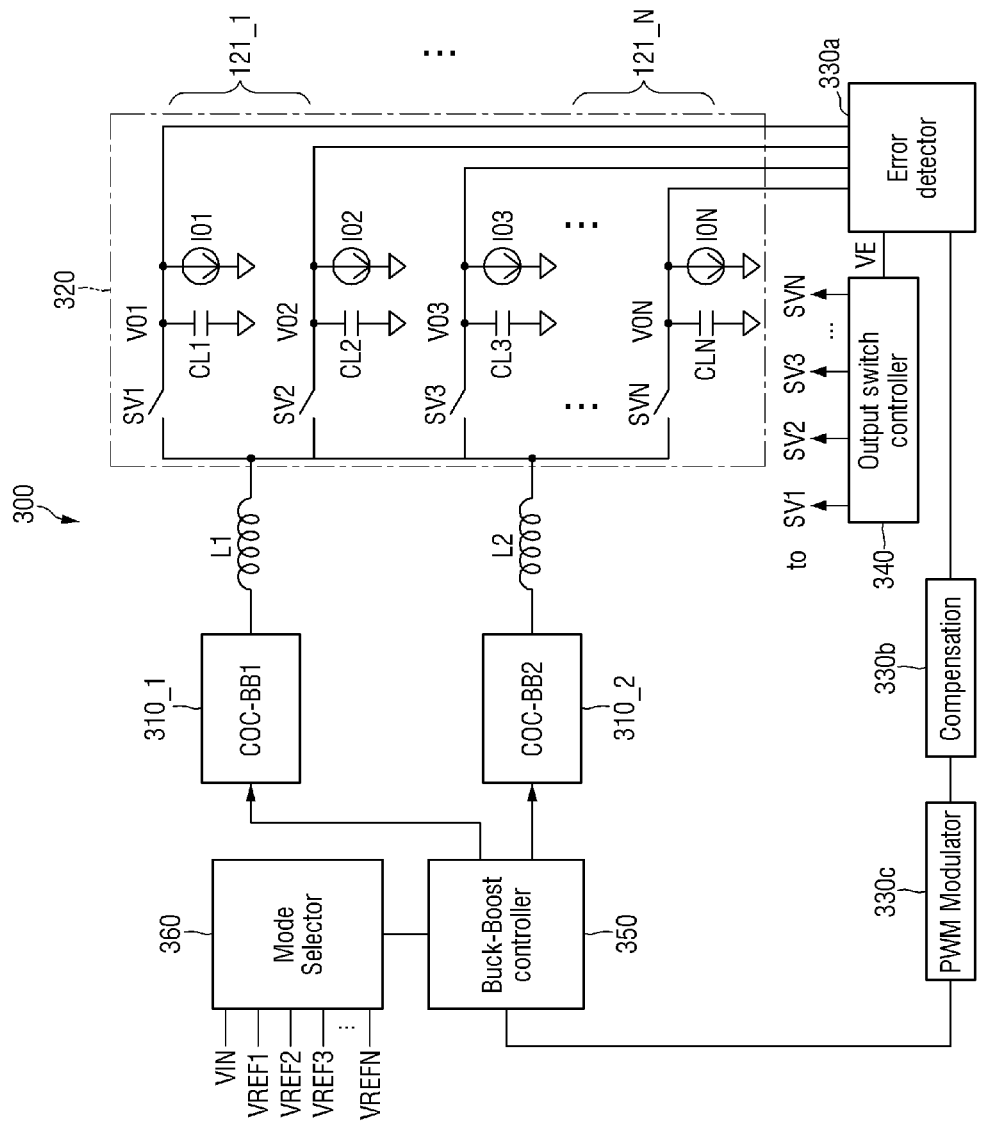
FIG. 17 is a circuit diagram illustrating a switching regulator circuit according to some exemplary embodiments.

FIG. 17 is a circuit diagram illustrating a switching regulator circuit according to some exemplary embodiments.

Referring to FIG. 17, a switching regulator circuit 300 may include at least two input circuits 310-1 and 310-2 and at least two inverters L1 and L2 each connected to the input circuits. For example, the switching regulator circuit 300 may include a first input circuit 310-1 and a first inductor L1, a second input circuit 310-2 and a second inductor L2, a multi-output end circuit 320 including N unit output ends 121_1 to 121_N, an error detection circuit 330a, a compensator 330b, a pulse width modulation circuit 330c, an output switch controller 340, an input switch controller 350, and a mode selector 360. In FIG. 17, N is illustrated as four or more, but in other embodiments, N may be as low as two.

For example, when any one (e.g. the RF-PA module 50) of the respective components 20 to 50 of FIG. 2 receiving a converted voltage requires a much higher instantaneous peak current than the other components, a high instantaneous peak current may be generated using one or more inductors. For example, while the first input circuit 310-1 operates as a current source, the second input circuit 310-2 may operate in an interleaving boost mode to reduce an output ripple of the multi-output end circuit 320.

Hence, the first input circuit 310-1 and the second input circuit 310-2 may be switched synchronously to operate alternately or may operate in an asynchronous boosting mode.

Figure 18:
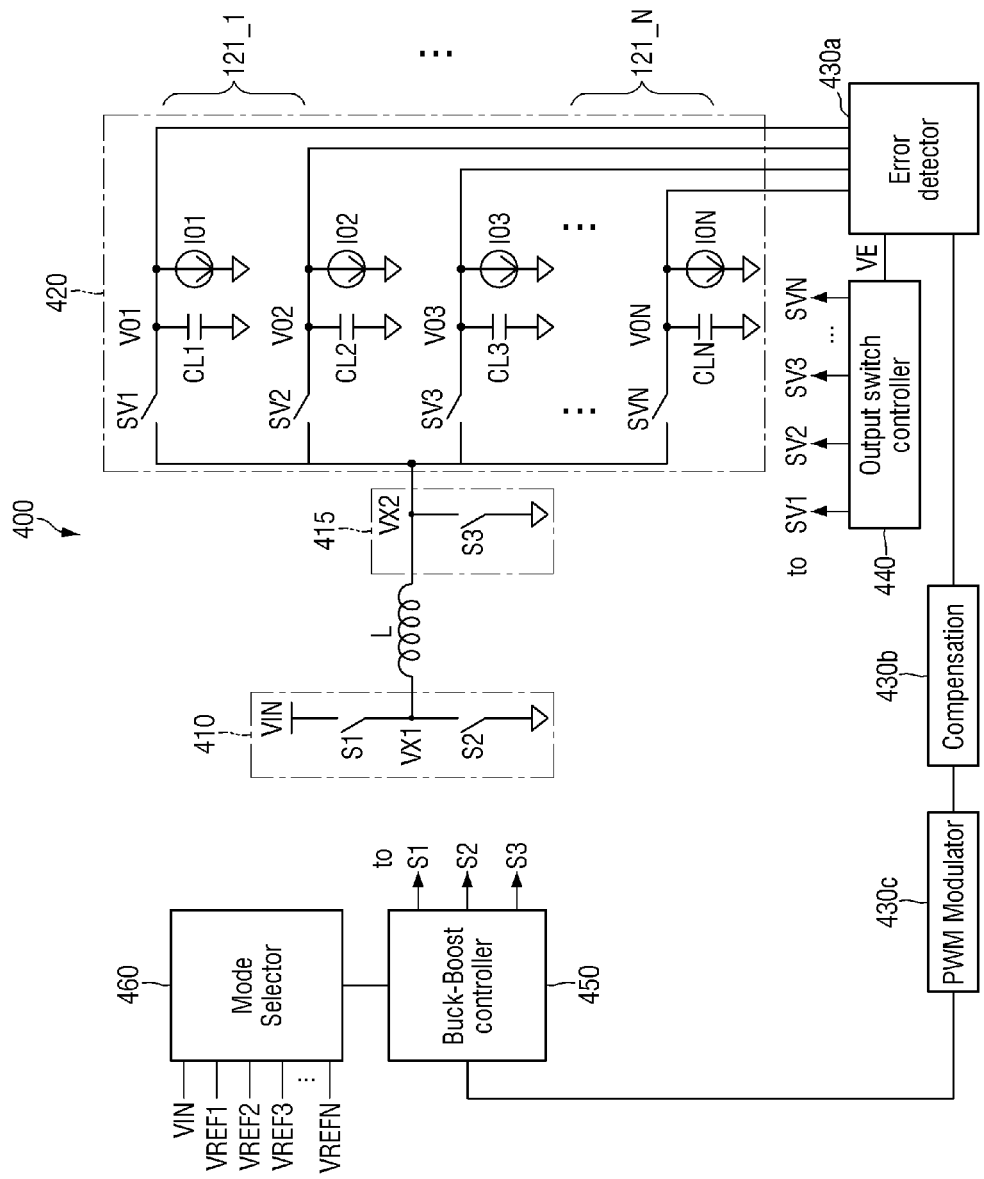
FIG. 18 is a circuit diagram illustrating a switching regulator circuit according to some exemplary embodiments.

FIG. 18 is a circuit diagram illustrating a switching regulator circuit according to some exemplary embodiments, and FIG. 19 is a table illustrating operating modes of the switching regulator circuit of FIG. 18.

Referring to FIG. 18, a switching regulator circuit 400 may include an input circuit 410, an inductor L, a connection node switching circuit 415, a multi-output end circuit 420, an error detection circuit 430a, a compensator 430b, a pulse width modulation circuit 430c, an output switch controller 440, an input switch controller 450, and a mode selector 460. Redundant description of components previously described will be omitted. The multi-output end circuit 420 includes at least two unit output ends 121_1 to 121_N (N=at least two, although at least four unit output ends 121_1 to 121_N are illustrated in FIG. 18).

The input circuit 410 includes a plurality of input switches. The input switch S1 is connected between a power supply end and an inductor input node VX1, and the input switch S2 is connected between the inductor input node VX1 and a ground conductor. The connection node switching circuit 415 includes a connection node switch S3. The connection node switch S3 is connected between an inductor output node VX2 and the ground conductor. The input switches S1 and S2 and the connection node switch S3 are turned on/off under the control of the input switch controller 450.

The switching regulator circuit 400 may operate in a plurality of operating modes. For example, the switching regulator circuit 400 may operate in a buck mode, a buck-boost mode, and a boost mode.

Referring to FIG. 19, the mode selector 460 may compare a maximum output voltage VO_max and a minimum output voltage VO_min of the multi-output end circuit 420 with an input voltage VIN or a scaled input voltage with respect to VIN, which may be VIN scaled by a predetermined scale factor (greater than or less than 1). The input voltage or scaled input voltage may be used to select an operating mode of the switching regulator circuit 400. For example, the predetermined scale factor may be (1−a) or (1+a), where "a" is a constant, and for example, a=0.1, but any suitable value may be substituted.

For example, when the minimum output voltage is smaller than the input voltage (VO_min<VIN) and the maximum output voltage is smaller than (1−a) times the input voltage (VO_max<VIN(1−a)), the switching regulator circuit 400 may operate in the buck mode.

For example, when the minimum output voltage is smaller than the input voltage (VO_min<VIN) and the maximum output voltage is greater than or equal to (1−a) times the input voltage and smaller than (1+a) times the input voltage (VIN(1−a)≤VO_max<VIN(1+a)), the switching regulator circuit 400 may operate in the buck-boost mode.

For example, when the minimum output voltage is smaller than the input voltage (VO_min<VIN) and the maximum output voltage is greater than or equal to (1+a) times the input voltage (VIN(1+a)≤VO_max)), the switching regulator circuit 400 may operate in the buck-boost mode.

For example, when the minimum output voltage is greater than the input voltage (VO_min>VIN) and the maximum output voltage is greater than or equal to (1−a) times the input voltage and smaller than (1+a) times the input voltage (VIN(1−a)≤VO_max<VIN(1+a)), the switching regulator circuit 400 may operate in the buck-boost mode.

For example, when the minimum output voltage is greater than the input voltage (VO_min>VIN) and the maximum output voltage is greater than or equal to (1+a) times the input voltage (VIN(1+a)≤VO_max)), the switching regulator circuit 400 may operate in the boost mode.

FIGS. 20A to 22B are diagrams illustrating operating modes of the switching regulator circuit of FIG. 19.

Figure 20A:
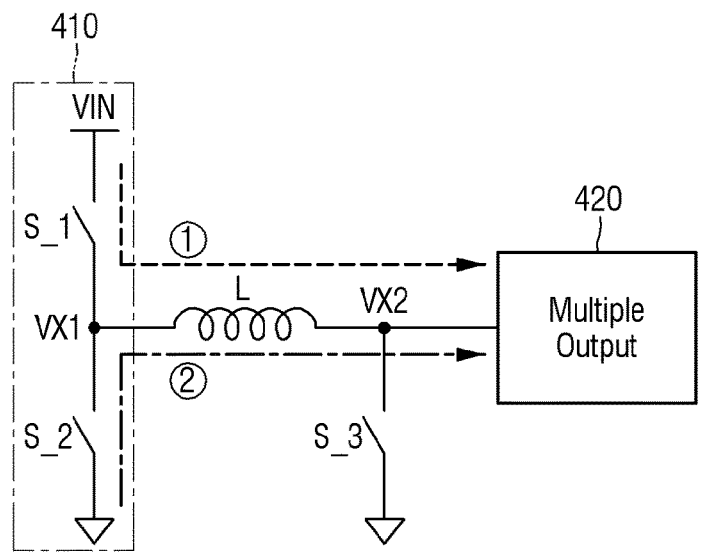
FIGS. 20A, 20B, 21A, 21B, 22A and 22B are diagrams illustrating operating modes of the switching regulator circuit of FIG. 19.
Figure 20B:
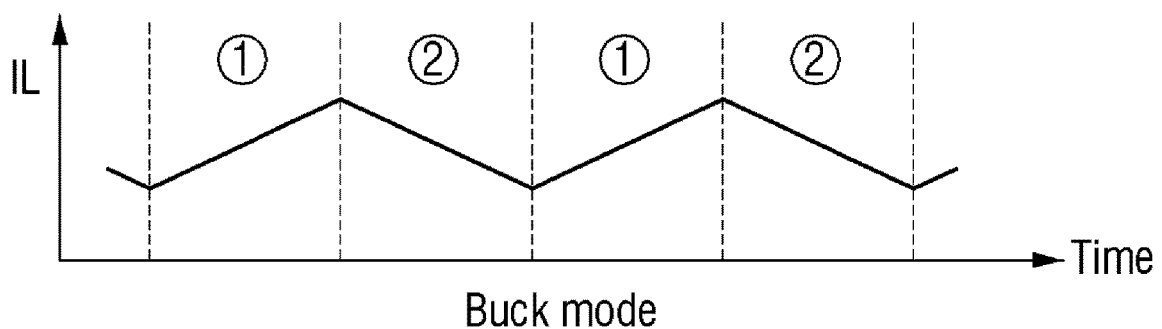

Referring to FIGS. 20A and 20B, when the switching regulator circuit operates in the buck mode, the input circuit 410 and the connection node switching circuit 415 of the switching regulator circuit 400 operate in a first phase and a second phase. In the first phase (①), the input switch S1 is turned on, the input switch S2 is turned off, and the connection node switch S3 is turned off. The input voltage VIN is provided as an applied voltage VX1 of the inductor L, and an output voltage VX2 of the inductor is provided to the multi-output end circuit 420 so that an inductor current IL gradually rises. In the second phase (②), the input switch S2 and the input switch S1 are turned off, and the connection node switch S3 is turned off. A ground voltage GND is provided as the applied voltage VX1 of the inductor L, and the output voltage VX2 of the inductor is provided to the multi-output end circuit 420 so that an inductor current IL gradually falls.

Figure 21A:
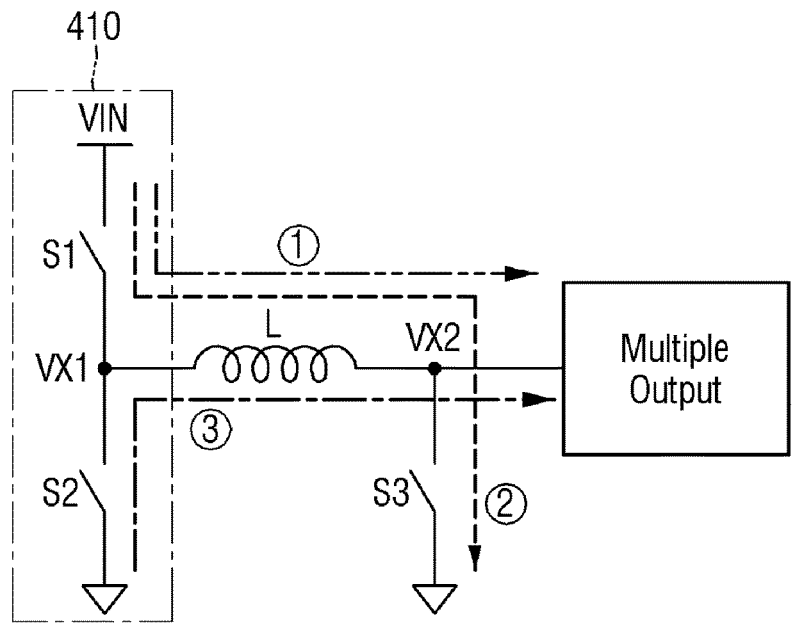
Figure 21B:
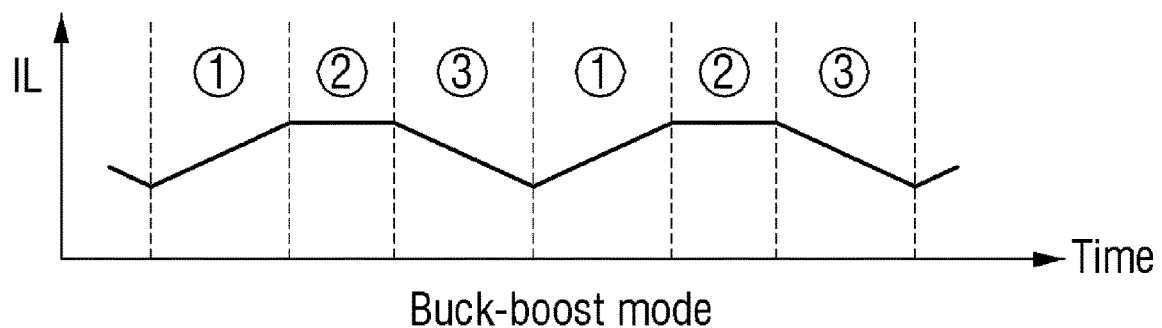

Referring to FIGS. 21A and 21B, when the switching regulator circuit operates in the buck-boost mode, the input circuit 410 and the connection node switching circuit 415 of the switching regulator circuit 400 operate in a first phase, a second phase, and a third phase. In the first phase (①), the input switch S1 is turned on, the input switch S2 is turned off, and the connection node switch S3 is turned off. The input voltage VIN is provided as an applied voltage VX1 of the inductor L, and an output voltage VX2 of the inductor is provided to the multi-output end circuit 420 so that an inductor current IL gradually rises. In the second phase (②), the input switch S1 is turned on, the input switch S2 is turned off, and the connection node switch S3 is turned on. For example, the inductor current is continuously generated, but is not provided to the multi-output end circuit 420 and flows to the ground conductor, and is thus maintained at a constant level. In the third phase (③), the input switch S2 and the input switch S1 are turned off, and the connection node switch S3 is turned off. A ground voltage GND is provided as the applied voltage VX1 of the inductor L, and the output voltage VX2 of the inductor is provided to the multi-output end circuit 420 so that an inductor current IL gradually falls.

Figure 22A:
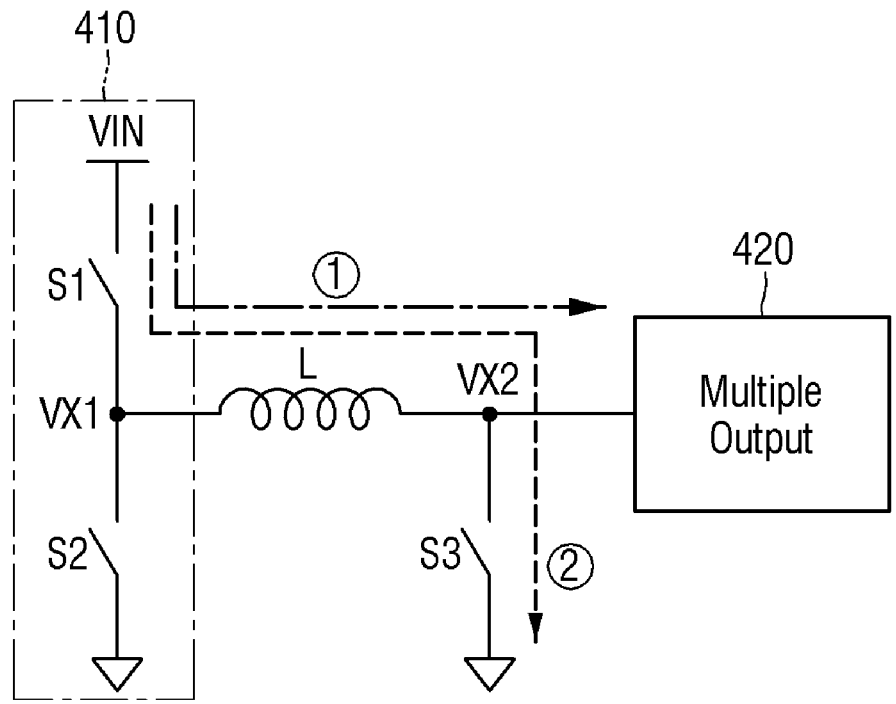
Figure 22B:
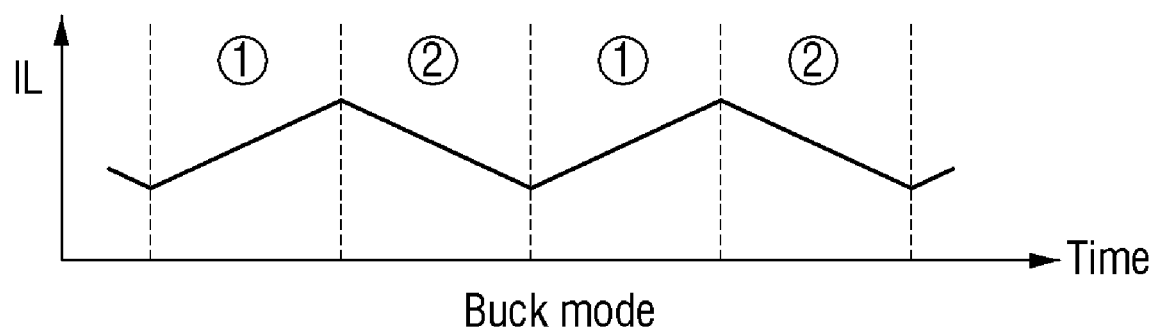

Referring to FIGS. 22A and 22B, when the switching regulator circuit operates in the boost mode, the input circuit 410 and the connection node switching circuit 415 of the switching regulator circuit 400 operate in a first phase and a second phase. In the first phase (①), the input switch S1 is turned on, the input switch S2 is turned off, and the connection node switch S3 is turned off. The input voltage VIN is provided as an applied voltage VX1 of the inductor L, and an output voltage VX2 of the inductor is provided to the multi-output end circuit 420 so that an inductor current IL gradually rises. In the second phase (②), the input switch S1 is turned on, the input switch S2 is turned off, and the connection node switch S3 is turned on. The input voltage VIN is provided as an applied voltage VX1 of the inductor L, and an output voltage VX2 of the inductor is provided to the ground conductor, such that the inductor current gradually decreases.

Exemplary embodiments of the present disclosure have been described hereinabove with reference to the accompanying drawings, but the present disclosure is not limited to the above-described exemplary embodiments, and may be implemented in various different forms, and one of ordinary skill in the art to which the present disclosure pertains may understand that the present disclosure may be implemented in other specific forms. Therefore, it is to be understood that the exemplary embodiments described above are illustrative rather than being restrictive in all aspects.

What is claimed is:

1. A switching regulator circuit comprising:
   an input circuit configured to boost an input voltage and thereby generate an applied voltage, the input circuit including a first circuit part and a second circuit part each including a plurality of input switches;
   an inductor having a first end that receives the applied voltage;
   a multi-output end circuit including a first unit output end and a second unit output end each connected to a second end of the inductor, each of the first unit output end and second unit output end including at least one output switch;
   an error detection circuit configured to generate an error detection current and an error detection voltage based on a first output voltage of the first unit output end and a second output voltage of the second unit output end;

an output switch controller configured to generate an output switch control signal for controlling the output switch based on the error detection voltage and the error detection current;

a mode selector configured to select one of a plurality of operating modes based on the input voltage (VIN) and respective target output voltage for the first or second unit output ends; and an input switch controller configured to generate an input switch control signal for controlling the input switches based on the selected operating mode, wherein the first circuit part includes a first flying capacitor and the second circuit part includes a second flying capacitor, and the input switch controller alternately charges the first flying capacitor and the second flying capacitor according to the input switch control signal, such that the input circuit outputs the applied voltage.

2. The switching regulator circuit of claim 1, wherein the error detection circuit includes:

an error amplifier including a first unit error amplifier comparing the first output voltage with a first output reference voltage and outputting a first error detection current and a second unit error amplifier comparing the second output voltage with a second output reference voltage and outputting a second error detection current;

a current addition circuit summing the first error detection current and the second error detection current and outputting a summed error detection current; and a compensation circuit generating a summed error detection voltage based on the summed error detection current.

3. The switching regulator circuit of claim 2, wherein the output switch controller includes:

a maximum voltage selection circuit comparing a first error detection voltage obtained by adding a bias current to the first error detection current and performing current-voltage conversion with a second error detection voltage obtained by adding the bias current to the second error detection current and performing current-voltage conversion and selecting a maximum error detection voltage; and a minimum on-time adjustment circuit adjusting an on-time of an output switch control signal of a node of the maximum error detection voltage among inputs of the maximum voltage selection circuit so as to be maintained for a preset minimum unit time or longer and outputting the output switch control signal.

4. The switching regulator circuit of claim 3, wherein the output switch controller controls the on-time of the output switch control signal so that the on-time does not overlap an on-time of an output switch control signal for another output end.

5. The switching regulator circuit of claim 3, wherein the output switch controller controls an on-time of a first output switch control signal of the first unit output end to be longer than an on-time of a second output switch control signal of the second unit output end when the first error detection voltage of the first unit output end is greater than the second error detection voltage of the second unit output end.

6. The switching regulator circuit of claim 3, wherein a second output switch control signal of the second unit output end is turned on when the second error detection voltage becomes greater than the first error detection voltage.

7. The switching regulator circuit of claim 1, further comprising a pulse width modulator that generates a pulse width modulation (PWM) signal, the PWM signal being applied to the input switch controller, wherein the PWM signal is a signal of which a pulse width is adjusted according to a comparison result between a ramp-up voltage and the error detection voltage output from the error detection circuit.

8. The switching regulator circuit of claim 1, wherein the mode selector selects the operating mode at any given time according to a target voltage for one of the unit output ends, wherein a reference voltage within a range of the target voltage is set based on the input voltage or a scaled value of the input voltage, the reference voltage is applied to each of the mode selector and the error correction circuit, the error correction circuit compares a current output voltage of the unit output end with the reference voltage and sets a duration of the output switch control signal controlling an on state of the switch of the unit output end based on the comparison.

9. The switching regulator circuit of claim 1, wherein the first circuit part includes:

a 1$a$-th switch having one end connected to a power supply end to which the input voltage is supplied;

a 2$a$-th switch having one end connected to ground;

the first flying capacitor connected between the other end of the 1$a$-th switch and the other end of the 2$a$-th switch;

a 3$a$-th switch connected between the other end of the 1$a$-th switch and one end of the inductor; and a 4$a$-th switch connected between the power supply end and the other end of the 2$a$-th switch, and the second circuit part (110$b$) includes:

a 1$b$-th switch having one end connected to a power supply end to which the input voltage is supplied;

a 2$b$-th switch having one end connected to ground;

the second flying capacitor connected between the other end of the 1$b$-th switch and the other end of the 2$b$-th switch;

a 3$b$-th switch connected between the other end of the 1$b$-th switch and one end of the inductor; and a 4$b$-th switch connected between the power supply end and the other end of the 2$b$-th switch.

10. A switching regulator circuit comprising:

a first input circuit including:

a first circuit part and a second circuit part, including a plurality of first input switches and a flying capacitor, boosting an input voltage, and outputting the boosted voltage as a first applied voltage;

a first inductor receiving the first applied voltage;

a second input circuit including a third circuit part and a fourth circuit part each including a plurality of second input switches, boosting an input voltage, and outputting the boosted voltage as a second applied voltage;

a second inductor receiving the second applied voltage;

a multi-output end circuit including a first unit output end, a second unit output end, and a third unit output end each connected to a common output end between the first inductor and the second inductor, each of the first to third unit output ends including at least one output switch;

an error detection circuit generating first to third error detection currents and first to third error detection voltages based on each of first to third output voltages of the first to third unit output ends;

an output switch controller generating an output switch control signal for controlling the output switch based on the first to third error detection currents;

a mode selector configured to select operating modes based on the input voltage and respective target output voltages of the first through third unit output ends; and an input switch controller configured to receive a selection result of the mode selector and based thereon, generate an input switch control signal for controlling the first input switches and the second input switches.

11. The switching regulator circuit of claim 10, wherein the error detection circuit includes:
    first to third error amplifiers comparing the first to third output voltages with first to third output reference voltages each corresponding to the first to third unit output ends, respectively, and outputting the first to third error detection currents, respectively;
    a current addition circuit summing the first error detection current, the second error detection current, and the third error detection current and outputting a summed error detection current; and
    a compensation circuit generating a summed error detection voltage based on the summed error detection current.

12. The switching regulator circuit of claim 11, wherein the input switch controller adjusts a pulse width of the input switch control signal according to a comparison result between a ramp-up voltage and the summed error detection voltage.

13. The switching regulator circuit of claim 11, wherein the output switch controller includes:
    a maximum voltage selection circuit selecting a maximum error detection voltage of first to third error detection voltages based on the first to third error detection currents and performing current-voltage conversion; and
    a minimum on-time adjustment circuit adjusting an on-time of an output switch control signal of a node of the maximum error detection voltage among inputs of the maximum voltage selection circuit so as to be maintained for a preset minimum unit time or longer and outputting the output switch control signal.

14. The switching regulator circuit of claim 13, wherein the output switch controller controls the on-time of the output switch control signal to not overlap an on-time of an output switch control signal for another output end.

15. The switching regulator circuit of claim 13, wherein the output switch controller controls an on-time of a first output switch control signal of the first unit output end to be longer than an on-time of a second output switch control signal of the second unit output end when the first error detection voltage of the first unit output end is greater than the second error detection voltage of the second unit output end.

16. The switching regulator circuit of claim 13, wherein a second output switch control signal of the second unit output end is turned on when the second error detection voltage becomes greater than the first error detection voltage.

17. A switching regulator circuit comprising:
    an input circuit including a plurality of input switches, configured to boost an input voltage or a ground voltage, and to output the boosted voltage as an applied voltage;
    an inductor that receives the applied voltage;
    a connection node switching circuit including a connection node switch connected between an output end of the inductor and a ground conductor;
    a multi-output end circuit including a first unit output end, a second unit output end, and a third unit output end connected to the output node of the inductor, each of the first to third unit output ends including at least one output switch;
    an error detection circuit configured to generate first to third error detection currents and first to third error detection voltages based on first to third output voltages of the first to third unit output ends;
    an output switch controller configured to generate an output switch control signal for controlling the at least one output switch of each of the first to third unit output ends based on the first to third error detection currents;
    a mode selector configured to select operating modes based on the input voltage and respective target output voltages of the first to third unit output ends; and
    an input switch controller receiving a comparison result of the mode selector, selecting one of a plurality of operating modes, and generating an input switch control signal for controlling the input switch and the connection node switch.

18. The switching regulator circuit of claim 17, wherein the error detection circuit includes:
    first to third error amplifiers comparing the first to third output voltages with first to third output reference voltages each corresponding to the first to third unit output ends, respectively, and outputting the first to third error detection currents, respectively;
    a current addition circuit summing the first error detection current, the second error detection current, and the third error detection current and outputting a summed error detection current; and
    a compensation circuit generating a summed error detection voltage based on the summed error detection current.

19. The switching regulator circuit of claim 18, wherein the output switch controller includes:
    a maximum voltage selection circuit selecting a maximum error detection voltage of first to third error detection voltages based on the first to third error detection currents and performing current-voltage conversion; and
    a minimum on-time adjustment circuit adjusting an on-time of an output switch control signal of a node of the maximum error detection voltage among inputs of the maximum voltage selection circuit so as to be maintained for a preset minimum unit time or longer and outputting the output switch control signal.

20. The switching regulator circuit of claim 19, wherein the input switch controller adjusts a pulse width of the input switch control signal according to a comparison result between a ramp-up voltage and the summed error detection voltage output from the error detection circuit.

* * * * *